(12) United States Patent
Saito et al.

(10) Patent No.: US 6,377,723 B1
(45) Date of Patent: Apr. 23, 2002

(54) OPTICAL WAVEGUIDE CIRCUIT, AND METHOD FOR COMPENSATING THE LIGHT TRANSMISSION WAVELENGTH

(75) Inventors: Tsunetoshi Saito; Toshihiko Ohta, both of Tokyo (JP)

(73) Assignee: The Furukawa Electric Co., Ltd, Tokyo (JP)

( * ) Notice: Subject to any disclaimer, the term of this patent is extended or adjusted under 35 U.S.C. 154(b) by 0 days.

(21) Appl. No.: 09/660,942

(22) Filed: Sep. 13, 2000

Related U.S. Application Data

(63) Continuation of application No. PCT/JP00/00111, filed on Jan. 12, 2000.

(30) Foreign Application Priority Data

Jan. 13, 1999 (JP) .......................................... 11-006694

(51) Int. Cl.⁷ ................................................ G02B 6/26
(52) U.S. Cl. ...................................................... 385/15
(58) Field of Search ............................ 385/4, 6, 11–14, 385/1, 37, 147, 17; 359/124, 128–130, 120, 333

(56) References Cited

U.S. PATENT DOCUMENTS

| | | | |
|---|---|---|---|
| 4,904,037 A | | 2/1990 | Imoto et al. |
| 5,684,899 A | * | 11/1997 | Takeshi ...................... 385/14 |
| 5,799,118 A | | 8/1998 | Ogusu et al. |
| 5,854,700 A | * | 12/1998 | Takeshi ...................... 359/136 |
| 5,915,054 A | * | 6/1999 | Takeshi ...................... 485/46 |
| 5,930,439 A | | 7/1999 | Ojha et al. |
| 5,938,811 A | | 8/1999 | Greene |

FOREIGN PATENT DOCUMENTS

| | | | | |
|---|---|---|---|---|
| EP | 0 091 984 A2 | | 10/1983 | |
| EP | 0 907 091 A2 | | 4/1999 | |
| JP | 63-184708 | | 7/1988 | |
| JP | 6-76906 | | 10/1994 | |
| JP | 10-227930 | | 8/1998 | |
| JP | 11-109155 | | 4/1999 | |
| JP | 200206348 A | * | 7/2000 | ............... 385/14 |
| WO | WO-200042457 A1 | * | 10/2000 | ............... 385/14 |

* cited by examiner

*Primary Examiner*—Akm E. Ullah
(74) *Attorney, Agent, or Firm*—Oblon, Spivak, McClelland, Maier & Neustadt, P.C.

(57) ABSTRACT

A plate-shaped member (8a) whose linear expansion coefficient is larger than that of a substrate (1) is provided on the rear side of the substrate (1) of an arrayed waveguide diffraction grating (11) which divides, by a diffraction effect of an array waveguide (40), lights of a plurality of wavelengths from those having a plurality of wavelengths different from each other, which are inputted from an optical input waveguide (2), and outputs these lights from the respective optical output waveguides (6). A light transmission feature of the respective output lights includes a light transmission feature for causing lights to be transmitted, centering around the center wavelengths of light transmission, which are different from each other, wherein the center wavelengths of light transmission shifts to the long wavelength side by a temperature rise.

30 Claims, 19 Drawing Sheets

OPTICAL WAVEGUIDE CIRCUIT, AND METHOD FOR COMPENSATING THE LIGHT TRANSMISSION WAVELENGTH

This application is a continuation of PCT/JP00/00111 filed Jan. 12, 2000.

TECHNICAL FIELD

The present invention relates to an optical waveguide circuit, which is used as a wavelength filter and an optical wavelength synthesizing and dividing device, etc., used for light transmissions, and a method for compensating the light transmission wavelength. In particular, the invention relates to an optical waveguide circuit which compensates for a fluctuation in temperature of the light transmission wavelength, and a method for compensating the light transmission wavelength thereof.

BACKGROUND OF THE ART

Recently, as a method to remarkably increase a transmission capacity in optical transmissions, studies and research have actively been carried out with respect to optical wavelength division multiplexing transmissions, and actual uses thereof have been commenced. The optical wavelength division multiplexing transmission is, for example, to transmit a plurality of lights having different wavelengths from each other while multiplexing the same. In such a system for optical wavelength division multiplexing transmission, it is indispensable to provide, in the system, an optical wavelength synthesizing and dividing device to pick up lights of each wavelength from the plurality of lights to be transmitted, at the light receiving side. Also, an optical wavelength synthesizing and dividing device used for optical wavelength division multiplexing transmissions is constructed so as to be provided with a light transmission device, which transmits only lights of predetermined wavelengths, or an optical reflection device, etc., which reflects only lights of predetermined wavelengths.

As one example of a light transmission device, there is a planar light waveguide circuit (PLC: Planar Light-wave Circuit) shown in, for example, FIG. 13. An optical waveguide circuit shown in the same drawing is called an arrayed waveguide diffraction grating (AWG: Arrayed Waveguide Grating). The arrayed waveguide diffraction grating 11 is such that a waveguide construction formed of a glass material is constructed on a substrate 1 formed of silicon, etc., In the waveguide construction, an input side slab waveguide 3 which acts as a first slab waveguide is connected to the emitting side of one or more optical input waveguides 2, and an array waveguide 40 which consists of a plurality of optical waveguides 4 is connected to the emitting side of the input side slab waveguide 3. An output side slab waveguide 5 which acts as the second slab waveguide is connected to the emitting side of the array waveguide 40 while a plurality of optical output waveguides 6 juxtaposed to each other are connected to the emitting side of the output side slab waveguide 5.

The array waveguide 40 propagates light emitted from the input side slab waveguide 3, which consists of optical waveguides 4 whose lengths are different from each other, wherein the lengths of optical waveguides adjacent to each other have a difference of ΔL. Also, optical input waveguides 2 and optical output waveguides 6 are those that are provided, corresponding to the number of signal lights having wavelengths different from each other, which are divided by, for example, an arrayed waveguide diffraction grating 11. Further, the array waveguide 40 is formed of a number of optical waveguides 4, for example, 100 waveguides. However, in the same drawing, the number of respective optical waveguides 2, 4, and 6 are simplified and illustrated for simplification of the drawing.

For example, transmission side optical fibers (not illustrated) are connected to the optical input waveguides 2 to cause wavelength-multiplexed lights to be introduced. Lights introduced into the input side slab waveguide 3 through the optical input waveguides 2 are propagated by its diffraction effect and are made incident into the respective optical waveguides 4 of the array waveguide 40, whereby the lights are propagated in the respective optical waveguides 4 (array waveguide 40).

Lights propagated in the array waveguide 40 reach the output side slab waveguide 5, and are collected to and outputted to the optical output waveguides 6. Also, since the lengths of optical waveguides 4 which form the array waveguide 40 are different from each other, shifts arise in the phase of the individual light phase after the lights are propagated in the array waveguide 40. Accordingly, the wave plane of a convergent light is inclined in compliance with a shift amount of the phase, and a position, at which the convergent light is caused to converge, is determined by an angle of the inclination.

Further, where it is assumed that the angle (diffraction angle) is θ at which a light is caused to converge when a light is made incident into the output side slab waveguide 5 from the array waveguide 40, there is a relationship between the θ and the wavelength λ of the convergent light as shown in the following expression.

$$n_s\theta + n_c\Delta L = m\lambda \qquad (1)$$

In expression (1), $n_s$ is a refractive index of the output side slab waveguide 5, and $n_c$ is a refractive index (effective refractive index) of optical waveguides 4 which forms an array waveguide 40. Also, m is the number of diffractions, whose figure is an integral number. In expression (1), where the wavelength is λ when, for example, θ=0 is established, the following expression (2) can be established.

$$l\_0 = nc\Delta L/m \qquad (2)$$

Therefore, the converging positions of lights having different wavelengths become different from each other, whereby it is possible to output lights having different wavelengths from different optical output waveguides 6 corresponding to the respective wavelengths.

An arrayed waveguide diffraction grating 11 has an optical dividing feature which, on the basis of the principle described above, divides lights having a plurality of wavelengths from those having the correspsonding plurality of wavelengths, different from each other, which are inputted from the optical input wavelengths 2, and outputs these from the respective optical output waveguides 6. And, a light transmission feature of the respective lights outputted from the respective optical output waveguides 6 becomes a feature as shown in, for example, FIG. 14(a). That is, the light transmission feature of the abovementioned respective lights has a light transmission feature in which the light transmission ratio is reduced in compliance with the wavelength being deviated from the center wavelength of the transmission of the respective lights centering around the center wavelengths of the respective light transmissions different from each other, in at least a predetermined wavelength area. In addition, the center wavelengths of the respective light transmissions in the light transmission feature are proportionate to a different (ΔL) in the length of optical waveguides 4 forming an array waveguide 40, and effective refractive index nc of the optical waveguides 4.

In addition, the abovementioned light transmission feature does not necessarily have a relative maximum figure. For example, as shown in (b) in the same drawing, there may be a light transmission feature which has two relative maximum figures. Also, the wavelength showing the light transmission feature is not necessarily one for a specified optical output waveguide 6, and the wavelengths can be established, respectively, for the numbers m of diffraction which are different from each other in expression (1), wherein there exist a plurality of wavelengths for each of the numbers of diffraction. Therefore, where, for example, an arrayed waveguide diffraction grating is used for waveguide multiplexed light transmission, the number m of diffraction is determined so that the light transmission feature corresponds to the use wavelength of wavelength multiplexed optical transmission, whereby an arrayed waveguide diffraction grating 11 is designed.

Since the arrayed waveguide diffraction grating 11 has a feature as described above, it can be used as a wavelength multiplexing and dividing device for wavelength multiplexed transmission. For example, as shown in FIG. 13, as wavelength multiplexed lights having wavelengths $\lambda 1$, $\lambda 2$, $\lambda 3$, ... $\lambda n$ (where n is an integral number exceeding 2) are inputted from one optical input waveguides 2, these lights are widened by input side slab waveguides 3 and reach the array waveguide 40. And, the lights reaching the array waveguide 40 pass through the array waveguide 40, further pass through the output side slab waveguide 5, and are caused to converge at positions different in compliance with wavelengths, and finally outputted from the emitting ends of optical output waveguides 6 through the respective optical output waveguides 6. The lights outputted from the optical output waveguides 6, that is, lights of the respective divided wavelengths are picked up via optical fibers (not illustrated) for output of lights, which are connected to the emitting ends of the respective optical output waveguides 6.

In this case, the transmission feature (wavelength feature of transmission light intensity of an array wavelength type diffraction grating 11) of lights outputted from the respective optical output waveguides 6 becomes as shown in FIG. 15 and becomes transmission spectra centering around the respective wavelengths ($\lambda 1$, $\lambda 2$, $\lambda 3$, ... $\lambda n$). Further, in the same drawing, wavelength features outputted from different optical output waveguides 6 are described in piles.

Also, since the arrayed waveguide diffraction grating 11 utilizes the principle of reversibility of an optical circuit, the same can be used as a wavelength multiplexing (synthesizing) device. That is, for example, as shown in FIG. 16, a plurality of lights having wavelengths different from each other are made, one by one, incident from the respective optical output wavelengths 6, these lights pass through the reversed propagation channel of the above channel, and synthesized by an array waveguide 40, and emitted from one optical input waveguide 2.

In such an array type waveguide diffraction grating 11, as described above, the diffraction grating is formed of an array waveguide 40, and a wavelength resolution power of the arrayed waveguide diffraction grating 11 is proportionate to difference (ΔL) in length of the optical waveguides 4 forming the array waveguide 40. Therefore, by designing the ΔL large, the arrayed waveguide diffraction grating 11 is capable of optically synthesizing wavelength multiplexed lights having a narrow interval which cannot be achieved by any of the prior arts. Accordingly, the arrayed waveguide diffraction grating 11 can accomplish an optical synthesizing and dividing feature (which is a feature by which a plurality of light signals whose wavelength interval is 1 nm or less) are divided or synthesized) necessary to achieve an optical wavelength multiplexing transmission of a higher-fiber packaging density. In addition, the arrayed waveguide diffraction grating 11 is, as described above, produced by accumulating and forming the waveguide configuration on a silicon substrate 1, using a glass material. The production is easy, which is preferable for mass production.

In order to use the arrayed waveguide diffraction grating 11 for wavelength multiplexing transmissions, it is necessary that the center wavelength of wavelengths which are divided or synthesized by an array waveguide 40, that is, the center wavelength of light transmission in the abovementioned light transmission feature is made coincident with a specified wavelength for wavelength multiplexed transmissions, so-called a grid wavelength. Also, as described above, the arrayed waveguide diffraction grating 11 is such a diffraction grating that divides multiplexed wavelengths and multiplexes wavelengths by utilizing a length of optical waveguides 4, which form the array waveguide 40, and a difference ΔL in the length. Accordingly, in the arrayed waveguide diffraction grating 11, it is necessary to accurately form the difference ΔL in the length of adjacent optical waveguides 4 forming an array waveguide 40.

Further, in order to use an array waveguide diffraction grating 11 for wavelength multiplexed optical transmissions, it is requested for the arrayed waveguide diffraction grating 11 that the center wavelength in the abovementioned light transmission is fixed in a use temperature range as a diffraction grating for wavelength multiplexed optical transmissions.

However, in an arrayed waveguide diffraction grating 11 produced in actuality, a shift arises in the length of optical waveguides 4 forming an array waveguide 40 due to a difference, etc., in production. Therefore, the center wavelength in the light transmissions in an arrayed waveguide diffraction grating 11 is not necessarily coincident with the abovementioned grid wavelength in a set temperature in the arrayed waveguide diffraction grating 11. Also, due to the following principle, since the center wavelength in the light transmissions in an arrayed waveguide diffraction grating 11 has a temperature dependency, the center wavelength may change in the abovementioned use temperature range.

That is, lengths of optical waveguides 4 forming an array waveguide 40 may change due to thermal expansion and thermal contraction of a substrate and/or optical waveguides 4, which are produced by a temperature change of the arrayed waveguide diffraction grating 11. In line therewith, a difference ΔL in the length of the optical waveguides 4 may also change. Further, the effective refractive index $n_c$ of the optical waveguides 4 may change due to a temperature change of the arrayed waveguide diffraction grating 1. The length (optical path length or optical length) of an optical path of a light propagating in the array waveguide 40 may further change due to a temperature change of the arrayed waveguide diffraction grating 11. Therefore, since there is a change in the temperature of the arrayed waveguide diffraction grating 11, the collecting positions of lights condensed at the emitting end side of the output slab waveguide 5, passing through an array waveguide 40, may change. If so, the wavelengths of lights incident into the optical output waveguides 6 in the arrayed waveguide diffraction grating 11 shifts, whereby the center wavelength of the light transmission feature (the center wavelength of light transmissions) changes due to a temperature.

An amount of change in the center wavelength in light transmissions in line with the temperature changes can be obtained by differentiating the abovementioned expression (2) by using the temperature. The amount can be expressed by the following expression (3).

$$d\lambda/dT=(\lambda/nc)\times(dnc/dT)+(\lambda/L)\times(dL/dT) \quad (3)$$

In expression (3), the first term of the right side indicates temperature dependency of the effective refractive index of optical waveguides 4, and the second term of the right side indicates changes in temperature of the optical waveguides 4 forming an array waveguide 40 in line with expansion and contraction of a substrate 1.

FIG. 17 exemplarily shows the results of having measured transmission features of lights outputted from one optical output waveguide 6 in experiments, with respect to shifts in the center waveguide in the light transmission features. As shown in the same drawing, in the temperature range (a range from 0° C. through 60° C.) shown in the same drawing, the higher the temperature of an arrayed waveguide diffraction grating 11 becomes, the more the abovementioned center wavelength shifts to the longer wavelength side. Also, on the contrary, the lower the temperature of the arrayed waveguide diffraction grating 11 becomes, the more the center wavelength shifts to the shorter wavelength side.

It is considered that this is because an optical path sensed by lights passing through the array wavelength 40 is lengthened. It is considered that one of the reasons why the optical length sensed by lights passing through the array wavelength 40 is lengthened is that the first term of the right side of the abovementioned expression (3) is increased in line with an increase in the refractive index of glass being a waveguide material. Also, it is considered that another reason why the optical path sensed by lights passing through the array waveguide 40 is lengthened is that the length of the waveguide is physically increased by linear expansion of a substrate 1 and a waveguide material (that is, the second term of the right side of expression (3) is increased).

In addition, usually, a temperature regulating mechanism which can keep a waveguide circuit at a fixed temperature level is provided so that the center wavelength does not shift due to a temperature of the arrayed waveguide diffraction grating 11, whereby the temperature is kept at a fixed temperature level. That is, by providing such a temperature regulating mechanism, it is devised that no change arises in the refractive index and length of optical waveguides 4 which form an array waveguide 40.

The temperature regulating mechanism has a Peltier module 16 provided with a Peltier element, and a thermistor 18 as shown in, for example, FIG. 18. These elements are connected to a temperature controller (not illustrated) by a conductor 17. Also, the thermistor 18 is attached to a temperature holding plate 12 which intervenes between the Peltier module 16 and the substrate 1. Usually, a thermal silicone oil compound and a thermal silicone RTV (Room temperature vulcanizing agent) are provided between the substrate 1 and the temperature holding plate 12, and between the temperature holding plate 12 and the Peltier module 16, so that the heat transmission can be improved.

In an arrayed waveguide diffraction grating 11 in which such a temperature control mechanism is provided, the temperature of the temperature holding mechanism 12 is detected by the thermistor 18, and an electric current flowing in the Peltier module 16 is controlled while feeding back the figure by a temperature controller. If so, the temperature is accurately controlled so that the temperature of the arrayed waveguide diffraction grating 11 is fixed.

In order to make the center waveguide of transmission of the respective lights in the light transmission feature of the respective light outputted from the optical output waveguide 6 of the arrayed waveguide diffraction grating 11 coincident with the grid waveguide, the following control may be carried out. That is, a temperature at which the center wavelength of the light transmission is made coincident with the grid wavelength is established as the setting temperature, wherein the arrayed waveguide diffraction grating 11 may be used while the diffraction grating 11 is kept at the set temperature by the temperature holding mechanism. Also, it is considered that a temperature holding mechanism provided with a heater instead of the Peltier module 16 may be made available.

However, in order to keep the temperature of the arrayed waveguide diffraction grating 11 at a fixed level by providing such a temperature holding mechanism, it is necessary to prepare a heat generating or heat absorbing body such as a Peltier module 16 or a heater, a temperature detecting device such as a thermistor 18, and a temperature controller to control these elements, a power source, etc. Accordingly, an arrayed waveguide diffraction grating module in which these elements are provided becomes very expensive in cost, and further the module size thereof is also increased. That is, such shortcomings or problems arise.

Further, a Peltier module 16, a thermistor 18, a temperature controller, etc., are electrical components. If any difference in temperature occurs due to differences in these components, a shift may arise in compensation of the center waveguide of transmission of the lights, which is held by the temperature control of these elements. Therefore, control for which the temperature holding mechanism is provided has less reliability in compensation of the center wavelength of transmission of lights.

On the other hand, recently, an arrayed waveguide diffraction grating 11 of such a type as shown in FIG. 19 has been proposed. In the proposal, a groove 13 crossing an array waveguide 40 is formed on the path of the array waveguide 40, and a silicone resin 14, etc., whose refractive index is different from that of the array waveguide 40 is filled up in the groove, a shift in the center wavelength resulting from changes in the temperature can be compensated. The silicone resin 14 has a negative refractive temperature coefficient. Therefore, the groove 13 is made triangular in its cross section, and the length of silicone resin 14 filled therein is lengthened in line with an increase in the length of optical waveguides 4 forming the array waveguide 40. Thereby, all the wavelengths divided or synthesized by the array waveguide 40 are compensated by the silicone resin 14 with respect to the temperature, whereby the center wavelength of transmission of the lights can be compensated.

However, since an arrayed waveguide diffraction grating 11 of such a type is to compensate the temperature of the center wavelength of light transmission by a silicone resin 14 secured in the groove 13, it is necessary that the groove 13 be very accurately formed. Accordingly, it is very difficult to produce the arrayed waveguide diffraction grating 11, and mass production thereof is also difficult, whereby the cost of such an arrayed waveguide diffraction grating 11 is increased.

Further, in such an arrayed waveguide diffraction grating 11, even though the waveguide of the arrayed waveguide diffraction grating 11 and the groove 13 are accurately formed, it is unavoidable that a difference in production occurs. Therefore, where the center wavelength of the light transmission shifts from the grid wavelength due to the difference in production, the center length of the light transmission cannot be made coincident with the grid wavelength. Accordingly, when the center wavelength of the light transmission shifts from the grid wavelength in the construction illustrated in FIG. 13, it is necessary, as in FIG. 18, to construct the array waveguide type diffracting grating 11 by providing a Peltier module 16, etc., whereby the production cost is further increased.

In addition, where the arrayed waveguide diffraction grating 11 is used in, for example, an atmosphere whose temperature is kept at a predetermined temperature level, a shift in the center wavelength of the light transmission is compensated by the following method. That is, where the center wavelength shifts from the grid wavelength due to a difference in production of an arrayed waveguide diffraction grating 11, an intensive ultraviolet ray is irradiated onto an array waveguide 40, whereby since the refractive index of the array waveguide 40 permanently changes, it becomes possible to compensate the shift of the center wavelength of the light transmission. However, in the case of using this method, it is difficult to control the irradiation intensity and time of an ultraviolet ray, and the ultraviolet ray irradiation apparatus is large-sized and becomes expensive.

The present invention was developed to solve the abovementioned shortcomings and problems as in the prior arts, and it is therefore an object of the invention to provide an optical waveguide circuit which does not need any large-sized apparatus, is capable of compensating a temperature dependency of the center wavelength of light transmissions of an optical waveguide circuit such as an arrayed waveguide diffraction grating, and a shift from a predetermined set wavelength with ease and at a low cost, and a method for compensating the light transmission wavelengths.

DISCLOSURE OF THE INVENTION

In order to achieve the above object, the invention is provided with the means constructed as described above, in order to solve the abovementioned shortcomings and problems. That is, an optical waveguide circuit according to a first aspect of the invention, in which a first slab waveguide is connected to the emitting side of one of more optical waveguides juxtaposed to each other, an array waveguide, consisting of a plurality of waveguides whose lengths are different from each other, which propagates lights led out from the correspsonding first slab waveguide is connected to the emitting side of the corresponding first slab waveguide, a second slab waveguide is connected to the emitting side of the corresponding array waveguide, a waveguide construction, consisting of a plurality of optical output waveguides juxtaposed to each other, is formed on a substrate at the emitting side of the corresponding second slab waveguide, having an optical dividing feature for dividing lights of a plurality of wavelengths from lights having a plurality of wavelengths different from each other, which are inputted from the corresponding optical input waveguides, and outputting the same from respective optical output waveguides, light transmission features of the respective lights outputted from the respective corresponding optical output waveguides having the center wavelengths of light transmission different from each other in at least a predetermined wavelength area, and compensating a temperature dependency fluctuation of the center wavelengths of the light transmission; wherein by providing the corresponding array waveguide or the corresponding array waveguide and the first and second slab waveguides with a stress applying means for applying a stress dependent on a temperature in the direction of reducing the temperature dependency fluctuation of the center wavelengths of the corresponding respective light transmissions, the temperature dependency fluctuation of the center wavelengths of the corresponding respective light transmissions is reduced.

Further, an optical waveguide circuit according to a second aspect of the invention is featured in that, in addition to the first aspect of the invention, the temperature dependency fluctuation of the center wavelengths of the respective light transmissions in a temperature range from 0° C. through 70° C. is reduced to 0.3 nm or less.

In addition, an optical waveguide circuit according to a third aspect of the invention is featured in that, in addition to the first aspect of the invention, a reference temperature is measured, at which the center wavelengths of the corresponding respective light transmissions becomes a predetermined wavelength, a stress applying means is provided, in which a stress applied to the array waveguide or the corresponding array waveguide, and the first and second slab waveguides becomes zero, and the absolute figure of the stress is increased in line with an actual temperature shifting from the corresponding reference temperature, and the corresponding stress applying means is provided in the optical waveguide circuit in an atmosphere of the corresponding reference temperature, wherein a shift amount of the center wavelengths of the corresponding respective light transmissions from the corresponding set wavelength is kept within a shift amount predetermined in a predetermined temperature range including at least the corresponding reference temperature.

Further, an optical waveguide circuit according to a fourth aspect of the invention is featured in that, in addition to the first aspect of the invention, a reference temperature is measured, at which the center wavelengths of the corresponding respective light transmissions becomes a predetermined wavelength, a stress applying means is provided, in which a stress applied to the array waveguide or the corresponding array waveguide, and the first and second slab waveguides becomes zero, and the absolute figure of the stress is increased in line with an actual temperature shifting from the corresponding reference temperature, and the corresponding stress applying means is provided in the optical waveguide circuit in an atmosphere of the corresponding reference temperature, wherein the center wavelengths of the corresponding respective light transmissions are made into almost the corresponding set wavelengths in a predetermined temperature range including at least the corresponding reference temperature.

Also, an optical waveguide circuit according to a fifth aspect of the invention is featured in that, in addition to the first aspect of the invention, a stress applying means is provided, which applies a stress to an array waveguide or the corresponding array waveguide and the first and second slab waveguides in the corresponding set temperature so that the center wavelengths of the corresponding respective light transmissions become set wavelengths predetermined in a predetermined set temperature, and the corresponding stress applying means is provided in the correspsonding optical waveguide circuit at an atmosphere temperature where the stress applied from the corresponding array waveguide or the corresponding array waveguide, and the first and second slab waveguides become zero, wherein the center wavelengths of the corresponding respective light transmissions are made into almost the corresponding set wavelengths in the corresponding set temperature.

In addition, an optical waveguide circuit according to a sixth preferred embodiment of the invention, in which a first slab waveguide is connected to the emitting side of one of more optical waveguides juxtaposed to each other, an array waveguide, consisting of a plurality of waveguides whose lengths are different from each other, which propagate lights led out from the corresponding first slab is connected to the emitting side of the corresponding first slab waveguide, a second slab waveguide is connected to the emitting side of the corresponding array waveguide, a waveguide construction, consisting of a plurality of optical output waveguides juxtaposed to each other, is formed on a substrate at the emitting side of the corresponding second slab waveguide, having an optical dividing feature for dividing lights of a plurality of wavelengths from lights having a plurality of wavelengths different from each other, which are inputted from the corresponding optical input waveguides, and outputting the same from respective optical output waveguides, light transmission features of the respective lights outputted from the respective corresponding optical output waveguides having the center wavelengths of light transmission different from each other in at least a predetermined wavelength area, and compensating a temperature dependency fluctuation of the center wavelengths of the light transmission; wherein, when the center wavelengths of the corresponding light transmissions, respectively, shifts by an almost equal shift amount of wavelength from the respective predetermined wavelengths corresponding to the center wavelengths of the respective light transmissions, a shift of the center wavelengths of the corresponding respective light transmissions is reduced by providing a stress applying means which applies a stress in the direction of reducing the corresponding shift amount of wavelength to the corresponding array waveguide, and the corresponding array waveguide, and the first and second slab waveguides.

Also, an optical waveguide circuit according to a seventh aspect of the invention is featured in that, in addition to any one of the first through sixth aspect of the invention, a warp applying means which applies a stress to an optical waveguide by warping the corresponding substrate is provided as a stress applying means.

In addition, an optical waveguide circuit according to an eighth aspect of the invention is featured in that, in addition to any one of the first through sixth aspect of the invention, a pressure applying means which applies pressure to the corresponding substrate in the vertical direction is provided as a stress applying means.

Further, an optical waveguide circuit according to a ninth aspect of the invention is featured in that, in any one of the first through sixth aspect of the invention, a horizontal direction stress applying means which applies a tensile force or a compression force to the corresponding substrate in the horizontal direction is provided as a stress applying means.

Also, an optical waveguide circuit according to a tenth aspect of the invention is featured in that, in addition to the seventh aspect of the invention, a warp applying portion whose linear expansion coefficient is different from that of the corresponding substrate is provided with at least one of either the surface side of the corresponding optical waveguide or the rear side of the substrate to form a warp applying means.

In addition, an optical waveguide circuit according to an eleventh aspect of the invention is featured in that, in addition to the tenth aspect of the invention, a resin layer or a filler-contained resin layer is formed with at least one of either the surface side of the corresponding optical waveguide or the rear side of the substrate as a warp applying portion.

Further, an optical waveguide circuit according to a twelfth aspect of the invention is featured in that, in addition to the seventh aspect of the invention, a plate-shaped member whose linear expansion coefficient is different from that of the corresponding substrate is adhered to or welded to at least one of either the surface side of the optical waveguide or the rear side of the substrate to form a warp applying means.

Still further, an optical waveguide circuit according to a thirteenth aspect of the invention is featured in that, in addition to the seventh aspect of the invention, a temperature dependent warp changing portion in which the warp amount is changed on the basis of a temperature is provided with at least one of either the surface side of the optical waveguide or the rear side of the substrate to form a warp applying means.

And, an optical waveguide circuit according to a fourteenth aspect of the invention is featured in that, in addition to the thirteenth aspect of the invention, a plurality of plates whose linear expansion coefficients are different from each other are bonded to form a temperature dependent warp changing portion.

Further, an optical waveguide circuit according to a fifteenth aspect of the invention is featured in that, in addition to the thirteenth aspect of the invention, a temperature dependent warp changing portion is formed of a shape memory alloy plate.

Still further, a method (method for compensating a light transmission wavelength of an optical waveguide circuit) according to a first aspect of the invention, in which a first slab waveguide is connected to the emitting side of one of more optical waveguides juxtaposed to each other, an array waveguide, consisting of a plurality of waveguides whose lengths are different from each other, which propagate lights led out from the corresponding first slab is connected to the emitting side of the corresponding first slab waveguide, a second slab waveguide is connected to the emitting side of the corresponding array waveguide, a waveguide construction, consisting of a plurality of optical output waveguides juxtaposed to each other, is formed on a substrate at the emitting side of the corresponding second slab waveguide, having an optical dividing feature for dividing lights of a plurality of wavelengths from lights having a plurality of wavelengths different from each other, which are inputted from the corresponding optical input waveguides, and outputting the same from respective optical output waveguides, light transmission features of the respective lights outputted from the respective corresponding optical output waveguides having the center wavelengths of light transmission different from each other in at least a predetermined wavelength area, and compensating a temperature dependency fluctuation of the center wavelengths of the light transmission; wherein by providing the corresponding array waveguide or the corresponding array waveguide and the first and second slab waveguides with a stress applying means for applying a stress dependent on a temperature in the direction of reducing the temperature dependency fluctuation of the center wavelengths of the corresponding respective light transmissions, the temperature dependency fluctuation of the center wavelengths of the corresponding respective light transmissions is reduced.

A method according to a second aspect of the invention is featured in that, in addition to the first aspect of the invention, the temperature dependency fluctuation of the center wavelengths of the respective light transmissions in a temperature range from 0° C. through 70° C. is reduced to 0.3 nm or less.

In addition, a method according to a third aspect of the invention is featured in that, in addition to the first aspect of the invention, a reference temperature is measured, at which the center wavelengths of the corresponding respective light transmissions become a predetermined wavelength, a stress applying means is provided, in which a stress applied to the array waveguide or the corresponding array waveguide, and the first and second slab waveguides becomes zero, and the absolute figure of the stress is increased in line with an actual temperature shifting from the corresponding reference temperature, and the corresponding stress applying means is provided in the optical waveguide circuit in an atmosphere of the corresponding reference temperature, wherein a shift amount of the center wavelengths of the corresponding respective light transmissions from the corresponding set wavelength is kept within a shift amount predetermined in a predetermined temperature range including at least the corresponding reference temperature.

Further, a method according to a fourth aspect of the invention is featured in that, in addition to the first aspect of the invention, a reference temperature is measured, at which the center wavelengths of the corresponding respective light transmissions become a predetermined wavelength, a stress applying means is provided, in which a stress applied to the array waveguide or the corresponding array waveguide, and the first and second slab waveguides becomes zero, and the absolute figure of the stress is increased in line with an actual temperature shift from the corresponding reference temperature, and the corresponding stress applying means is provided in the optical waveguide circuit in an atmosphere of the corresponding reference temperature, wherein the center wavelengths of the corresponding respective light transmissions are made into almost the corresponding set wavelengths in a predetermined temperature range including at least the corresponding reference temperature.

Also, a method according to a fifth aspect of the invention is featured in that, in addition to the first aspect of the invention, a stress applying means is provided, which applies a stress to an array waveguide or the corresponding array waveguide and the first and second slab waveguides in the corresponding set temperature so that the center wavelengths of the corresponding respective light transmissions become set wavelengths predetermined in a predetermined set temperature, and the corresponding stress applying means is provided in the correspsonding optical waveguide circuit at an atmosphere temperature where the stress applied from the corresponding array waveguide or the corresponding array waveguide, and the first and second slab waveguides become zero, wherein the center wavelengths of the corresponding respective light transmissions are made into almost the corresponding set wavelengths in the corresponding set temperature.

In addition, a method according to a sixth preferred embodiment of the invention, in which a first slab waveguide is connected to the emitting side of one of more optical waveguides juxtaposed to each other, an array waveguide, consisting of a plurality of waveguides whose lengths are different from each other, which propagate lights led out from the corresponding first slab is connected to the emitting side of the corresponding first slab waveguide, a second slab waveguide is connected to the emitting side of the corresponding array waveguide, a waveguide construction, consisting of a plurality of optical output waveguides juxtaposed to each other, is formed on a substrate at the emitting side of the corresponding second slab waveguide, having an optical dividing feature for dividing lights of a plurality of wavelengths from lights having a plurality of wavelengths different from each other, which are inputted from the corresponding optical input waveguides, and outputting the same from respective optical output waveguides, light transmission features of the respective lights outputted from the respective corresponding optical output waveguides having the center wavelengths of light transmission different from each other in at least a predetermined wavelength area, and compensating a temperature dependency fluctuation of the center wavelengths of the light transmission; wherein, when the center wavelengths of the corresponding light transmissions, respectively, shifts by an almost equal shift amount of wavelength from the respective predetermined wavelengths corresponding to the center wavelengths of the respective light transmissions, a shift of the center wavelengths of the corresponding respective light transmissions is reduced by providing a stress applying means which applies a stress in the direction of reducing the corresponding shift amount of wavelength to the corresponding array waveguide, and the corresponding array waveguide, and the first and second slab waveguides.

Also, a method according to a seventh aspect of the invention is featured in that, in addition to any one of the first through sixth aspect of the invention, a warp applying means which applies a stress to an optical waveguide by warping the corresponding substrate is provided as a stress applying means.

In addition, a method according to an eighth aspect of the invention is featured in that, in addition to any one of the first through sixth aspect of the invention, a pressure applying means which applies pressure to the corresponding substrate in the vertical direction is provided as a stress applying means.

In addition, a method according to an eighth aspect of the invention is featured in that, in addition to any one of the first through sixth aspect of the invention, a pressure applying means which applies pressure to the corresponding substrate in the vertical direction is provided as a stress applying means.

Further, a method according to a ninth aspect of the invention is featured in that, in any one of the first through sixth aspect of the invention, a horizontal direction stress applying means which applies a tensile force or a compression force to the corresponding substrate in the horizontal direction is provided as a stress applying means.

Also, a method according to a tenth aspect of the invention is featured in that, in addition to the seventh aspect of the invention, a warp applying portion whose linear expansion coefficient is different from that of the corresponding substrate is provided with at least one of either the surface side of the corresponding optical waveguide or the rear side of the substrate to form a warp applying means.

In addition, a method according to an eleventh aspect of the invention is featured in that, in addition to the tenth aspect of the invention, a resin layer or a filler-contained resin layer is formed with at least one of either the surface side of the corresponding optical waveguide or the rear side of the substrate as a warp applying portion.

Further, a method according to a twelfth aspect of the invention is featured in that, in addition to the seventh aspect of the invention, a plate-shaped member whose linear expansion coefficient is different from that of the corresponding substrate is adhered to or welded to at least one of either the surface side of the optical waveguide or the rear side of the substrate to form a warp applying means.

Still further, a method according to a thirteenth aspect of the invention is featured in that, in addition to the seventh aspect of the invention, a temperature dependent warp changing portion in which the warp amount is changed on the basis of a temperature is provided with at least one of either the surface side of the optical waveguide or the rear side of the substrate to form a warp applying means.

And, a method according to a fourteenth aspect of the invention is featured in that, in addition to the thirteenth aspect of the invention, a plurality of plates whose linear expansion coefficients are different from each other are bonded to form a temperature dependent warp changing portion.

Further, a method according to a fifteenth aspect of the invention is featured in that, in addition to the thirteenth aspect of the invention, a temperature dependent warp changing portion is formed of a shape memory alloy plate.

The first through the fifth aspects of the invention are such that a stress applying means which applies a stress dependent on a temperature in the direction of reducing the temperature dependency fluctuations of the center wavelengths of transmissions of the respective lights outputted from the respective optical output waveguides of an optical waveguide circuit is provided in an array waveguide or the corresponding array waveguide and the first and second slab waveguides. That is, the first through the fifth aspects of the invention can reduce the temperature dependency fluctuations of the center wavelengths of the corresponding light transmissions with ease and with high reliability, and can reduce the temperature fluctuation of the respective light transmission wavelengths.

In particular, according to the second aspect of the invention, since the temperature dependency fluctuation of the center wavelength of the respective light transmissions in a temperature range from 0° C. through 70° C. can be reduced to 0.3 nm or less, the temperature dependency fluctuation of the center wavelength of the respective light transmissions in a temperature range from 10° C. through 50° C. can be reduced to 0.3 nm or less, whereby when an optical waveguide circuit is used for wavelength multiplexed optical transmissions indoors, it is possible to use the optical waveguide circuit without any difficulty. Also, according to the second aspect, by reducing the temperature dependency fluctuations of the center wavelength of the respective light transmissions in a temperature range from 0° C. through 70° C. to 0.3 nm or less, it becomes possible to reduce the temperature dependency fluctuations of the center wavelengths of the corresponding respective light transmissions in the current usage temperature range for wavelength-multiplexed transmissions to a very small figure. Therefore, with the second aspect, it is possible to use the optical waveguide circuit for wavelength-multiplexed transmissions not only indoors but also outdoors without any difficulty, and it is possible to form an optical waveguide circuit best suited to wavelength multiplexed transmissions.

Still further, the third aspect of the invention is such that a stress applying means is provided in an optical waveguide circuit in an atmosphere of the reference temperature, wherein the stress applied to the array waveguide or the corresponding array waveguide, and the first and second slab waveguides in the reference temperature at which the center wavelengths of the corresponding respective light transmission become a predetermined set wavelength become zero, and the stress applying means increase the absolute value of the stress in line with shifts of a temperature from the corresponding reference temperature.

Therefore, in the third aspect of the invention, by providing the stress applying means, it is possible to keep the shift amount of the center wavelengths of the corresponding respective light transmissions from the corresponding set wavelength within a predetermined set shift amount in a predetermined set temperature range including at least the reference temperature. Therefore, the third aspect of the invention can further make an optical waveguide circuit into an excellent optical waveguide circuit suitable for wavelength multiplexed optical transmissions.

In addition, the fourth aspect of the invention provides a stress applying means similar to that of the third aspect of the invention, wherein the corresponding stress applying means is employed in an atmosphere of the corresponding reference temperature, whereby in the fourth aspect of the invention, the center wavelength of the corresponding respective light transmission can be made into almost the set wavelength in a predetermined temperature range including at least the reference temperature. Therefore, the fourth aspect of the invention can eliminate almost all of not only the temperature dependency of the center wavelength of the corresponding light transmission but also a shift of the center wavelength of light transmission from the set wavelength such as the grid wavelength, etc., whereby an optical waveguide circuit can be further made into an excellent waveguide circuit suitable for a wavelength multiplexed optical transmission.

Also, in the fifth aspect of the invention, first, a stress applying means is provided, which applies a stress to an array waveguide, or the corresponding array waveguide, and the first and second slab waveguides at a predetermined set temperature so that the center wavelength of the respective light transmission is made into a predetermined set wavelength at the corresponding predetermined temperature. And, the stress applying means is provided in an optical waveguide circuit in an atmosphere of a temperature where the stress applied from the corresponding stress applying means to the array waveguide or the corresponding array waveguide, and the first and second slab waveguides become zero. Thereby, the fifth aspect of the present invention ensures that the center wavelength of the corresponding respective light transmission is made into almost the set wavelength at the corresponding set temperature. Therefore, if, in the fifth aspect of the invention, the use temperature in which the optical waveguide circuit is used for, for example, a wavelength multiplexed optical transmission, is determined at the corresponding set temperature, an optical waveguide circuit according to the fifth aspect of the invention can be made into an excellent optical waveguide circuit in which almost no shift from the set wavelength of the center wavelength of the respective light transmission at the corresponding set temperature is produced. Accordingly, in compliance with the fifth aspect of the invention, it is possible to make the optical waveguide circuit into an optical waveguide circuit best suited to a wavelength multiplexed optical transmission, etc.

Still further, the sixth aspect of the invention is such that, when the center wavelength of the respective light transmission shifts by wavelengths equal to each other from the respective predetermined wavelengths corresponding thereto, a stress applying means is provided, which applies a stress in the direction of diminishing the corresponding shift amount of wavelength to the array waveguide, or the corresponding array waveguide, and the first and second slab waveguides. And, by providing the stress applying means, it is possible to diminish a shift of the center wavelength of the respective light transmission. For this reason, according to the sixth aspect of the present invention, it is possible to very easily compensate a shift of the grid wavelength of the center wavelength of light transmission of an optical waveguide circuit such as an arrayed waveguide diffraction grating from the set wavelength at high reliability.

Also, according to a construction in which a warp applying means which applies a stress to an optical waveguide by warping the reference plane is provided as the stress applying means, a stress is applied onto the optical waveguide by warping the reference plane by warping the warp applying means, whereby the abovementioned excellent effect can be easily brought about.

In addition, according to a construction in which a pressure applying means for applying pressure in the direction vertical to the reference plane is provided as a stress applying means, a stress is applied to an optical waveguide by applying pressure in the direction vertical to the reference plane by the pressure applying means, whereby the abovementioned excellent effect can be easily brought about.

According to a construction in which a horizontal direction stress applying means which applies a tensile force or a compression force to the reference plane in the horizontal direction is provided as the stress applying means, a stress can be applied to an optical waveguide by applying a tensile force or a compression force to the reference plane in the horizontal direction by the horizontal direction stress applying means. With this construction, the abovementioned excellent effect can be easily brought about.

Also, according to a construction in which a warp applying portion whose linear expansion coefficient is different from that of the substrate is provided at least one of either the surface side of an optical waveguide or the rear side of the substrate in order to form a warp applying means, the warp applying means can be easily formed, and the abovementioned excellent effect can be brought about.

In addition, according to a construction in which a resin layer or filler-contained resin layer is formed at least one of either the surface side of an optical waveguide or the rear side of the substrate to bring about a warp applying portion, it is possible to easily form a warp applying portion, whereby the abovementioned effect can be brought about.

Further, according to a construction in which a plate-shaped member whose linear expansion coefficient is different from that of the substrate is adhered to or welded to at least one side of the surface side of an optical waveguide and the rear side of the substrate to form a warp applying means, the warp applying means can be very easily formed, and the abovementioned effect can be brought about. Still further, according to a construction in which a temperature dependency warp changing portion which changes the warping amount depending on a temperature is provided at least one of either the surface side of an optical waveguide or the rear side of the substrate to form a warp applying means, the warp applying means can be very easily formed, whereby the abovementioned excellent effect can be displayed.

Also, according to a construction in which a temperature dependency warp changing portion is formed by bonding a plurality of plates whose linear expansion coefficients are different from each other or a construction in which a temperature dependency warp changing portion is formed by using a shape memory alloy plate, the temperature dependency warp changing portion can be very easily formed, and the abovementioned excellent effect can be displayed.

Therefore, in the present invention, in either constructions described above, a stress applying means can be easily formed as described above, whereby a stress can be applied to an array waveguide or the corresponding array waveguide, and the first and second slab waveguides. Therefore, the invention does not require any large-sized apparatus, and is capable of compensating a shift of the center wavelength of the respective light transmission from the temperature dependency and established wavelengths with ease and at low cost.

BEST MODE FOR CARRYING OUT PREFERRED EMBODIMENTS

Figure 1A:
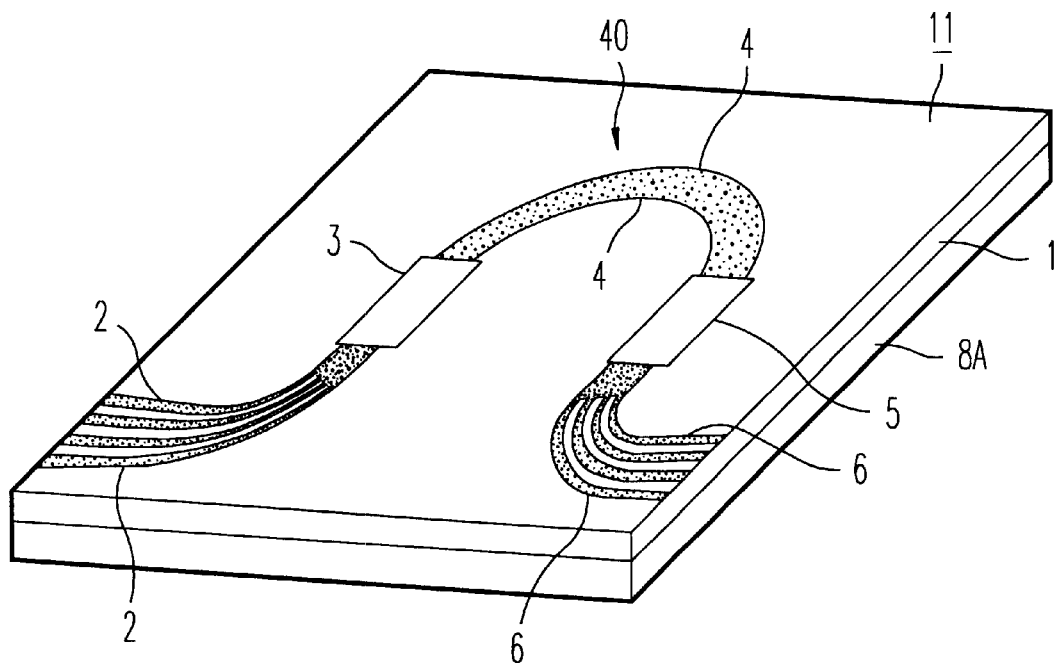
FIGS. 1(a)–(b) is a configurational view showing the major parts of a first preferred embodiment of an optical waveguide according to the invention.

To describe the invention in further detail, a description is given of preferred embodiments with reference to the accompanying drawings. The description of the preferred embodiments, parts which are identical to those of the prior art example are given the same reference numbers, and overlapping description thereof is omitted.

In FIG. 1, a first preferred embodiment of an arrayed waveguide diffraction grating according to the invention is illustrated. The optical waveguide circuit is an arrayed waveguide diffraction grating 11. Also, in (a) of the same drawing, a state of the arrayed waveguide diffraction grating 11 at a normal temperature (for example 25° C.) is illustrated. In (b) of the same drawing, a state of the arrayed waveguide diffraction grating 11 at a higher temperature than 25° C. is illustrated.

The arrayed waveguide diffraction grating 11 forms, on a single silicon crystal substrate, a waveguide construction which is similar to the waveguide construction of the arrayed waveguide diffraction grating illustrated in the prior art example. In the preferred embodiment, a stress applying means was provided, which applies a temperature-dependent stress to an array waveguide 40 or the array waveguide 40 and the input slab waveguides 3 and output slab waveguides 5, in the direction of reducing the temperature dependent fluctuations of respective center wavelengths of transmission of respective lights outputted from an optical output waveguides 6. And, a characteristic construction of the preferred embodiment is that, by providing the stress applying means as shown above, the temperature dependent fluctuations of the center wavelengths of the corresponding respective light transmission is attempted to be reduced.

In the preferred embodiment, the corresponding stress applying means is formed by a warp applying means which applies a stress to optical waveguides by warping the substrate surface. The warp applying means is formed by adhering a plate-shaped member 8a, whose linear expansion coefficient is different from that of the substrate 1, to the rear side of the substrate 1 of optical waveguides. Also, in the preferred embodiment, the plate-shaped member 8a is adhered so that no warp is produced on the substrate surface of an arrayed waveguide diffraction grating 11 at a normal temperature (initial state) when applying a temperature dependent stress by using the stress applying means, whereby the adhering work of the plate-shaped member 8a can be facilitated. However, it may be acceptable that, in a case where the plate-shaped member 8a is adhered in a state where there is warp on the substrate surface of the arrayed waveguide diffraction grating 11 in the initial state, the warping amount of the substrate plate changes dependent on a temperature.

The plate-shaped member 8a is formed of a metal plate whose linear expansion coefficient is greater than that of silicon being a material for forming the substrate 1. In detail, the plate-shaped member 8a may be formed of aluminum (Al) whose linear expansion coefficient is $290 \times 10^{-7}/°$ C., copper whose linear expansion coefficient is $200 \times 10^{-7}/°$ C., stainless steel whose linear expansion coefficient is $160 \times 10^{-7}/°$ C., etc. In addition, the linear expansion coefficient of silicon is $26 \times 10^{-7}/°$ C.

In the preferred embodiment, as described above, a plate-shaped member 8a whose linear expansion coefficient is greater than that of the substrate 1 was provided on the rear side of the substrate 1. Therefore, an arrayed waveguide diffraction grating 11 having no warp at a normal temperature as shown in FIG. 1(a) is warped to be convex downward, as shown in (b) of the same drawing, at an atmosphere temperature higher than the normal temperature. Further, the warp amount depends on the temperature of the arrayed waveguide diffraction grating 11. On the other hand, although not illustrated in the same drawing, the arrayed waveguide diffraction grating 11 is warped to be convex upwards, contrary to (b) in the same drawing, at an atmosphere temperature lower than the normal temperature. Also, the warp amount also depends on the temperature of the arrayed waveguide diffraction grating 11. The warp amount of the arrayed waveguide diffraction grating 11 is made greater in line with an increase in a difference between the normal temperature and the temperature of the arrayed waveguide diffraction grating 11 in either case where the arrayed waveguide diffraction grating 11 is warped to become convex downward or a case where warped to become convex upwards.

Further, in (b) of the same drawing, (b) of the same drawing exemplarily shows warp of the arrayed waveguide diffraction grating 11 in exaggeration. Actually however, the warp amount becomes ten plus μm or so in a range of several centimeters in width. Also, changes in the warp amount depending on a temperature also depends on not only the linear expansion coefficient of a plate-shaped member 8a but also the thickness and resilient coefficient of the substrate 1 and plate-shaped member 8a.

And, in the preferred embodiment, thus, by producing warp on the substrate 1 by the plate-shaped member 8a depending on a temperature, the following roles can be achieved. That is, the plate-shaped member 8a applies a stress dependent on a temperature to the array waveguide 40 or the array waveguide 40 and the input side slab waveguides 3 and output side slab waveguides 5 in the direction of reducing the temperature dependent fluctuations of the center wavelengths of transmission of respective lights outputted from the optical output waveguides 6. And, the plate-shaped member 8a attempts to reduce the temperature dependent fluctuations of the center waveguides of the corresponding respective light transmission at the arrayed waveguide diffraction grating 11.

Figure 1B:
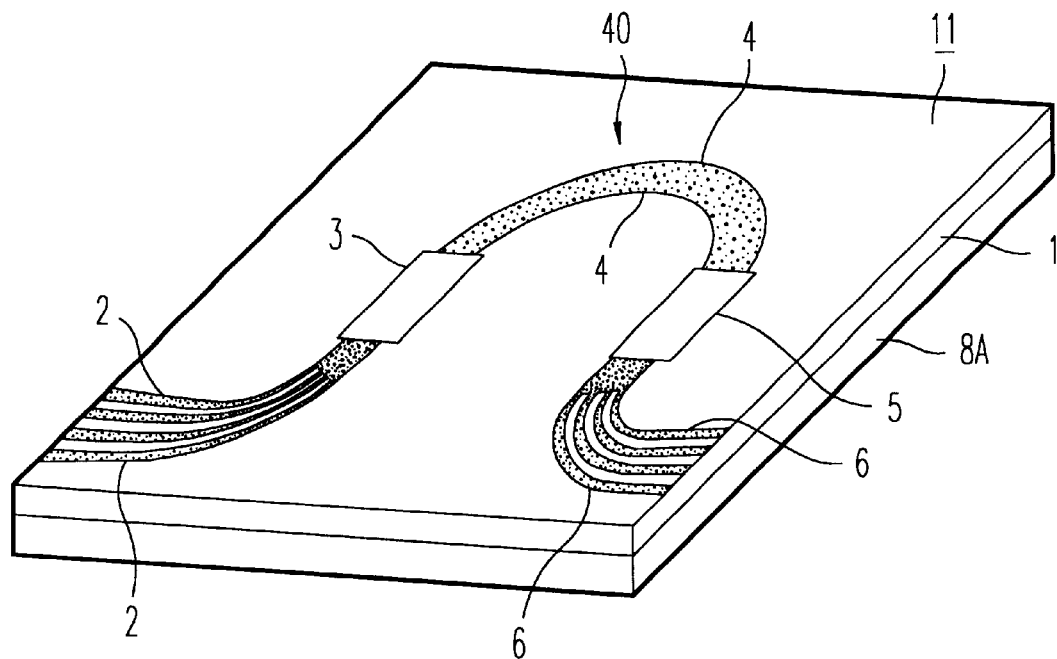
Figure 2:
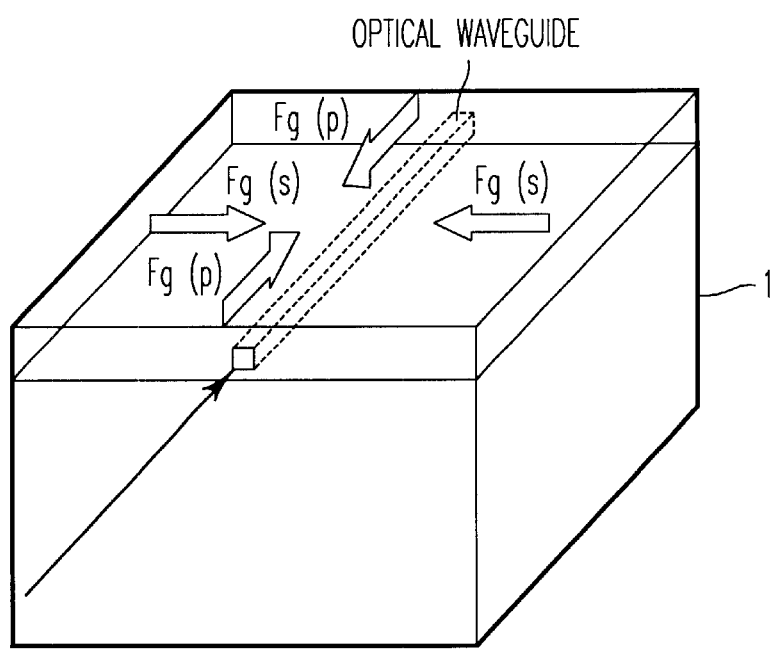
FIG. 2 is a view explaining the principle for compensating the center wavelengths of light transmission according to a method for compensating light transmission wavelengths of an optical waveguide circuit according to the invention.
Figure 2:
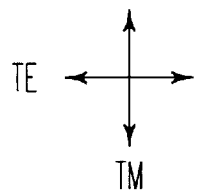

A lowering of the temperature dependent fluctuations of the center wavelengths of the respective light transmission can be accomplished as described above. That is, as the temperature of the arrayed waveguide diffraction grating 11 becomes higher than the normal temperature, the substrate changes from a state as shown in FIG. 1(a) to a state as shown in FIG. 1(b), whereby downward convex warp is produced. Thereby, as shown in FIG. 2, a stress of Fg (P) is applied to the optical waveguides (in this case, an array waveguide 40, or the array waveguide 40, and the input side slab waveguides 3 and output side slab waveguides 5) in the horizontal direction to the plane of the optical waveguide and in the direction parallel to the axis of the corresponding optical waveguide. Furthermore, by the downward convex warp of the arrayed waveguide diffraction grating 11, a stress of Fg (S) is applied to the optical waveguide in the horizontal direction to the plane of the optical waveguide and in the direction orthogonal to the axis of the optical waveguide.

Thus, the refractive index of the optical waveguide will change due to an optical resilient effect. Herein, if it is assumed that Fg (P)=Fg (S) is established, the change in the refractive index n can be expressed in terms of a change amount Δn (TE) with respect to a polarizing component TE horizontal to a substrate 1 of light and a change amount Δn (TM) with respect to a polarizing component TM vertical to the substrate 1 of light. These changes become change amounts shown in the following expressions (4) and (5).

$$\Delta n(TE) = C_1 \times Fg(S) + C_2 \times Fg(P) = (C_1 + C_2) \times Fg \quad (4)$$

$$\Delta n(TM) = C_2 \times Fe(S) + C_2 \times Fg(P) = 2C_2 \times Fg \quad (5)$$

where $C_1$ and $C_2$ are optical resilient constants of an optical waveguide material. Both $C_1$ and $C_2$ are a negative value in the case of quartz glass, whereby, as shown in FIG. 2, as a compression stress is applied to the optical waveguide, the refractive index of the optical waveguide will become small as has been made clear from these expressions (4) and (5). And, as the refractive index of the array waveguide 40 becomes small, the center wavelength of the respective light transmission outputted from the respective optical output waveguides 6 is caused to shift toward the short wavelength side as has been made clear from the abovementioned expression (3).

As described above, the temperature dependent fluctuation of the center wavelength of transmission of the respective lights outputted from the respective optical output waveguides 6 is a fluctuation dependent on a temperature, which is caused to shift to the long wavelength side as the temperature becomes higher. Therefore, as described above, where the center wavelength of the respective light transmission shifts to the short wavelength side since a compression stress resulting from warp on the substrate surface is applied to the array waveguide 40, depending upon the temperature, the temperature dependent fluctuation (shift to the long wavelength side) of the center wavelength of the respective light transmission can be counterbalanced by a shift to the short wavelength side shift. Therefore, in the preferred embodiment, the temperature dependent fluctuations of the center wavelength of the respective light transmission can be reduced.

Also, to the contrary, if upward convex warp is produced on the arrayed waveguide diffraction grating 11, a stress (tensile force) in the opposite direction Fg (P) and Fg (S) shown in FIG. 2 is applied to the optical waveguides (array waveguide 40, or the array waveguide 40, and the input side waveguides 3 and output side waveguides 5). Therefore, to the contrary, the refractive index of the abovementioned optical waveguide will be made large. And, as the refractive index of the array waveguide 40 becomes large, the center waveguides of transmission of respective lights outputted from the respective optical output waveguides 6 shifts to the long waveguide side as has been made clear in the abovementioned expression (3).

As described above, the temperature dependent fluctuation of the center wavelengths of transmission of the respective lights outputted from the respective optical output waveguides 6 is a temperature dependent fluctuation by which the center wavelengths of the respective light transmission shifts to the long wavelength side as the temperature is increased. Accordingly, as the temperature is made lower, the center wavelengths of the respective light transmission shifts to the short wavelength side. For this reason, as described above, a tensile stress resulting from warp on the substrate surface depending on a temperature is applied to the array waveguide 40 to cause the center waveguides of the respective light transmission to shift to the long wavelength side, whereby the abovementioned temperature dependent fluctuations (or the short wavelength side shift) of the center wavelengths of the respective light transmission are counterbalanced by the long wavelength side. Therefore, in the preferred embodiment, it is possible to reduce the temperature dependent fluctuations of the center wavelengths of the respective light transmission.

According to the preferred embodiment, as described above, by only adhering a plate-shaped member 8a, whose linear expansion coefficient is larger than that of the substrate 1, to the rear side of the substrate 1, the substrate surface can be warped, depending on a temperature, and it is possible to securely reduce the temperature dependent fluctuations of the center wavelengths of transmission of the respective lights outputted from the optical output waveguides 6 and the temperature dependent fluctuations of the light transmission wavelengths.

Figure 3:
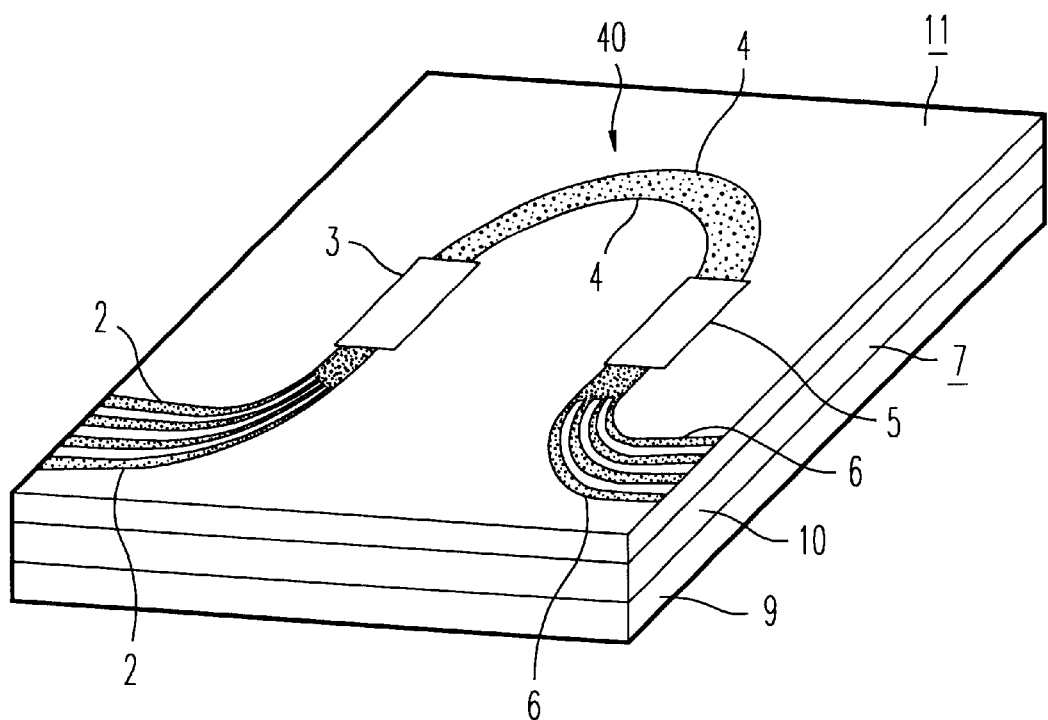
FIG. 3 is a configurational view showing the major parts of a second preferred embodiment of an optical waveguide circuit according to the invention.

FIG. 3 shows a second preferred embodiment of an optical waveguide circuit according to the present invention. The optical waveguide circuit is an arrayed waveguide diffraction grating 11, and in the same drawing, parts which are identical to those of the arrayed waveguide diffraction grating 11 illustrated in FIG. 1 are given the same reference numbers.

A characteristic point of an optical waveguide circuit of the second preferred embodiment, which is different from the optical waveguide circuit of the first preferred embodiment, is that a complex plate 7 (hereinafter called bimetal) is provided as a stress applying member. The bimetal 7 functions as a temperature dependent warp changing portion in which the warp amount changes depending on the temperature. In the second preferred embodiment, the substrate surface of the arrayed waveguide diffraction grating is warped by the bimetal 7 depending on a temperature, whereby the temperature dependency of the center wavelengths of transmission of the respective lengths outputted from the optical output waveguides 6 can be reduced. Also, the bimetal 7 can be formed by bonding plates 9 and 10 (two plates in the same drawing) whose linear expansion coefficients are different from each other.

Further, in order to execute the second preferred embodiment, the present inventor measured the reference temperature at which the center wavelength of the respective light transmission is made into a grid wavelength being the predetermined wavelength. And, the inventor prepared a bimetal 7 having the following characteristics. That is, with the bimetal 7 applied to the second preferred embodiment, the stress applied to an array waveguide 40 or the array waveguide 40, the input side slab waveguides 3, and the output side waveguides 5 as the reference temperature become zero, the absolute value of the abovementioned stress becomes large as the temperature shifts from the abovementioned reference temperature. The inventor installed the bimetal 7 in the arrayed waveguide diffraction grating 11 at an atmosphere having the reference temperature. Accordingly, the center wavelength of the corresponding respective light transmission of the arrayed waveguide diffraction grating 11 was made into 0.3 nm or less in such a state where the shift amount of the center wavelength of the respective light transmission from the grid wavelength is made into a predetermined shift amount in a predetermined temperature range (for example, from 0° C. through 70° C.) at least including the reference temperature. Also, in a predetermined temperature range (for example, from 0° C. through 70° C.) including the reference temperature, it is devised that the center wavelength of the respective light transmission of the arrayed waveguide diffraction grating 11 is made into almost the abovementioned grid wavelength.

In detail, the inventor measured the reference temperature at which the center wavelength of the respective light transmission becomes a grid wavelength being the predetermined wavelength, wherein the temperature was 40° C. Therefore, a bimetal having the following characteristics was formed. That is, a bimetal 7 applied to the second preferred embodiment has no warp at 40° C., wherein the stress applied to an array waveguide 40 or the array waveguide 40, the input side slab waveguides 3, and output side waveguides 5 become zero. In addition, the bimetal is warped so as to be made convex downward as the temperature becomes higher than 40° C., and it is warped so as to be made convex upward as the temperature becomes lower than 40° C., wherein the warp amount becomes 15 $\mu$m or so in a temperature range from 0° C. through 70° C.

Further, the bimetal is such that a metal, such as an invar alloy, etc., which has an extremely small linear expansion coefficient and a metal, such as a Ni alloy, etc., which has a large linear expansion coefficient and a high Young's modulus are bonded to each other, wherein a change of curvature due to a temperature change is extremely large. In the second preferred embodiment, a plate 9 made of NiMnFe and a plate 10 made of NiFe are bonded together, thereby forming a bimetal 7 which is 1 mm thick.

And, in the second preferred embodiment, the bimetal was provided in the arrayed waveguide diffraction grating 11 at an atmosphere whose temperature is 40° C., whereby, as described above, a shift of the array waveguide 40 from respective set wavelengths of the center wavelength of the respective light transmission was devised so as to become 0.3 nm or less at a temperature range from 0° C. through 70° C. and almost zero at a temperature range from 10° C. through 50° C.

Figure 4:
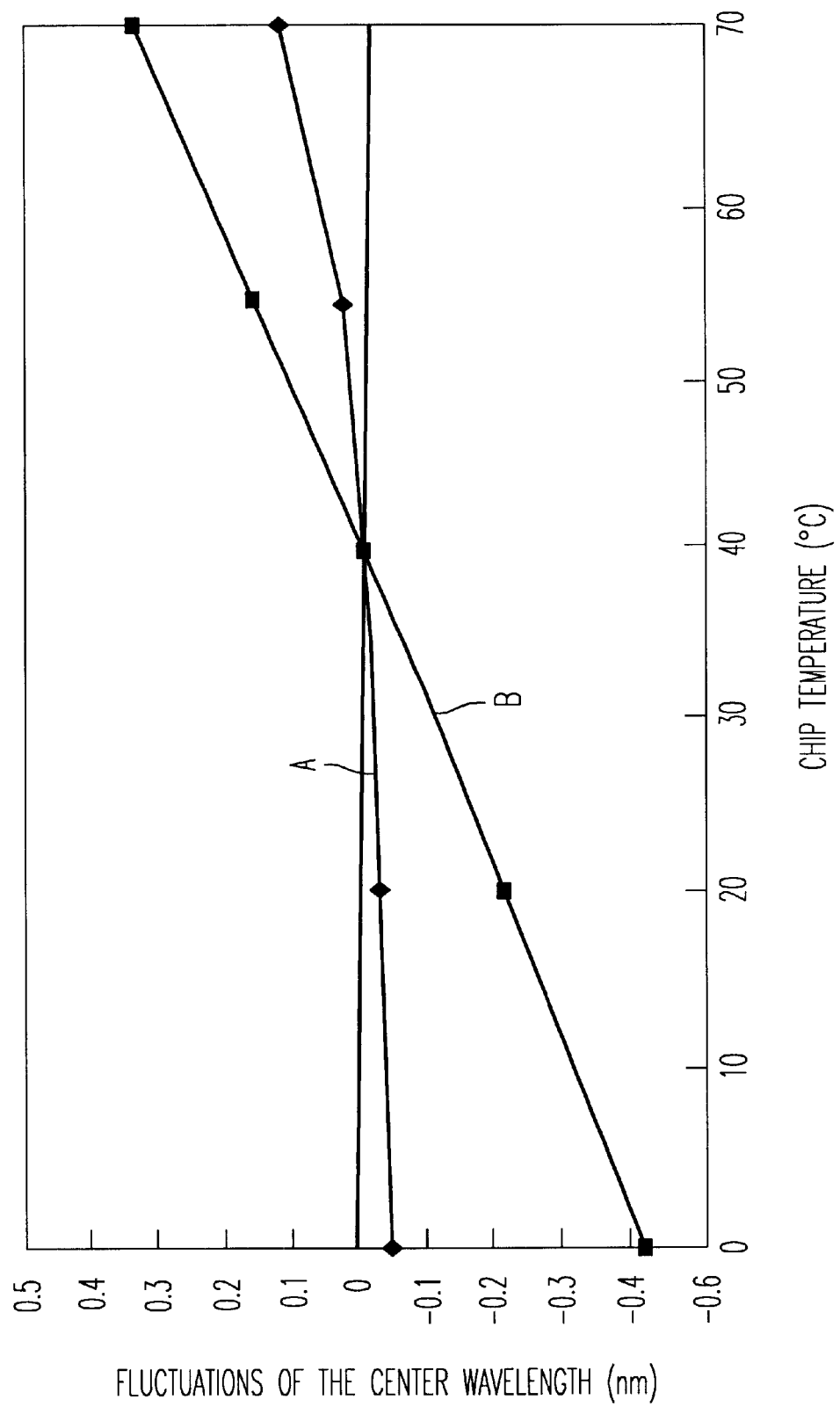
FIG. 4 is a graph showing temperature dependency of the light transmission center wavelengths of an arrayed waveguide diffraction grating of the second preferred embodiment, in comparison with the temperature dependency of the light transmission center wavelengths of an arrayed waveguide diffraction grating in a case where no temperature compensation is carried out.

A feature line a in FIG. 4 indicates temperature dependency of the center wavelength of the respective light transmission of the arrayed waveguide diffraction grating 11 as an optical waveguide circuit according to the second preferred embodiment. Also, another feature line b in the same drawing indicates temperature dependency of the center wavelength of the respective light transmission of the arrayed waveguide diffraction grating where no temperature compensation is carried out.

As has been made clear in the same drawing, the temperature dependency of the light transmission center wavelength of an arrayed waveguide diffraction grating 11 of the preferred embodiment is 0.002 nm/° C. or so. And, in a temperature range from 0° C. through 70° C., a fluctuation of only 0.16 nm or so arises as regards the center wavelength of the respective light transmission, and at any temperature in the temperature range, it was possible to reduce the shift amount between the center wavelength of the respective light transmission and the grid wavelength to 0.3 nm or less. The value can satisfy the wavelength characteristics (that a shift amount of the center wavelength of the respective light transmission from the grid wavelength in the use temperature range) required for an arrayed waveguide diffraction grating 11 generally used as a wavelength multiplexed optical transmission. And, the value is one-fifth or less the shift amount of the center wavelength of the respective light transmission from the grid wavelength in the use temperature range where no temperature compensation is carried out, whereby by applying the preferred embodiment, it was possible to reduce the temperature dependency of the center wavelength of the respective light transmission to one-fifth times or less.

Also, in the second preferred embodiment, in a range from 10° C. through 50° C., the center wavelength of the respective light transmission could be made almost coincident with the grid wavelength. That is, in the range, there is almost no temperature dependency of the center wavelength of the respective light transmission, and a very excellent arrayed waveguide diffraction grating 11, in which the center wavelength of the respective light transmission is almost coincident with the grid temperature at any temperature, can be produced.

Further, although it is a general rule that, in the temperature range from 0° C. through 70° C. as specifications having allowance or tolerance, an arrayed waveguide diffraction grating 11 is operatable, no problem is constituted if the arrayed waveguide diffraction grating 11 is operatable in a temperature range from 10° C. through 50° C. where it is used indoors. Taking this into consideration, if the shift amount of the center wavelength of the respective light transmission from the grid wavelength is 0.3 nm or less in the temperature range from 10° C. through 50° C., it is considered that it satisfies a feature requested as wavelength multiplexed optical transmissions with respect to an arrayed waveguide diffraction grating in which −1 dB band width is 0.6 nm or more at an interval of, for example, 200 GHz. In the second preferred embodiment, the shift amount of the center wavelength of the respective light transmission is made remarkably smaller than 0.3 nm in the temperature range from 10° C. through 50° C., and the shift amount can be made almost zero. Therefore, an optical waveguide circuit according to the preferred embodiment has a very excellent feature in compensating the center wavelength of light transmission, which can almost completely compensate the center wavelength of light transmission of an arrayed waveguide diffraction grating 11.

Figure 5A:
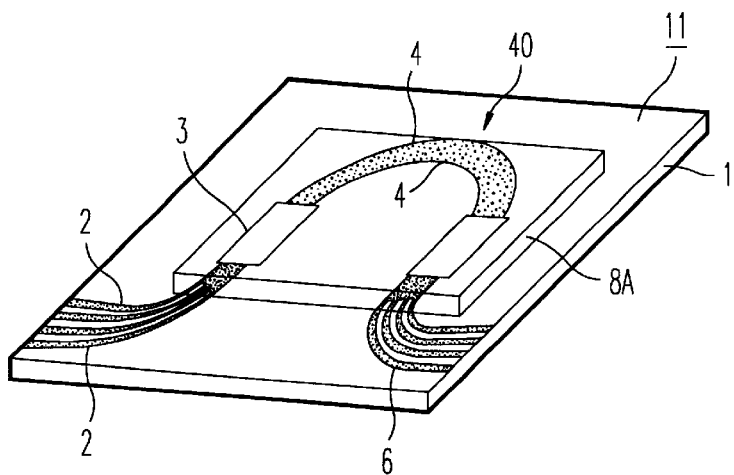
FIGS. 5(a)–(c) is a configurational view showing the major parts of another embodiment of an optical waveguide circuit according to the invention.
Figure 5B:
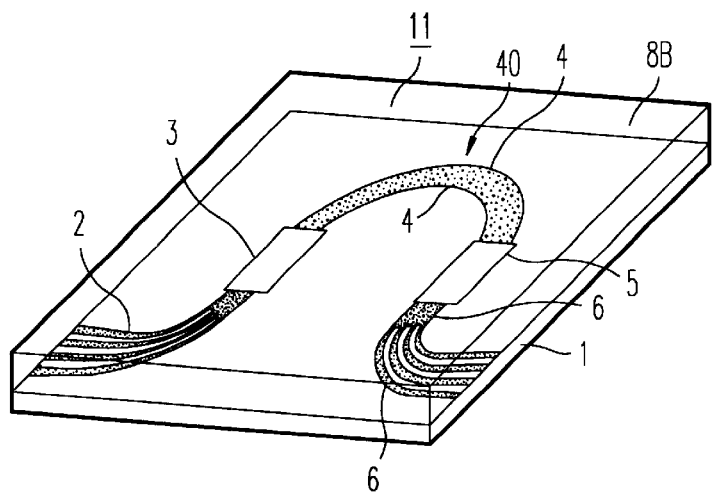
Figure 5C:
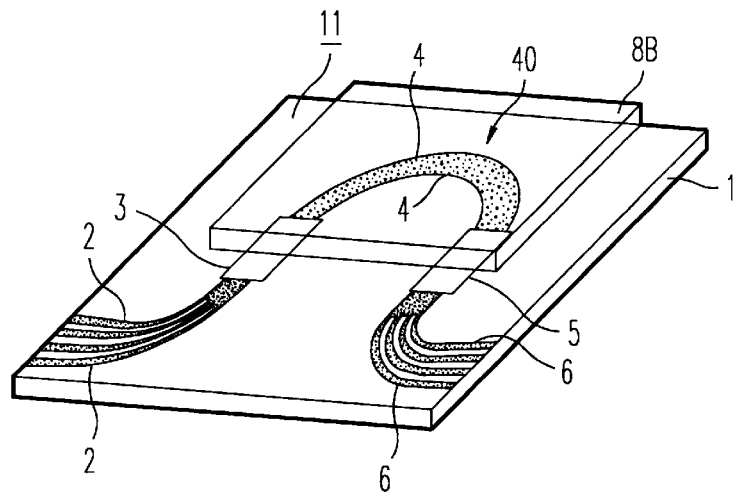

Further, the present invention is not limited to the above preferred embodiments, and may be subjected to various modifications and modes. For example, although, in the first preferred embodiment, the size of a plate-shaped member 8a whose linear expansion coefficient is larger than that of the substrate 1 is made equal to that of the substrate 1, and the plate-shaped member 8a is provided on the entire rear surface of the substrate 1, the size of the plate-shaped member 8a is not necessarily the same as that of the substrate 1. For example, as shown in FIG. 5(a), the plate-shaped member 8a may be formed smaller than the substrate 1, and may be provided on a part of the rear side of the substrate 1. On the contrary, the plate-shaped member 8a may be formed larger than the substrate 1, and may be secured on the rear side of the substrate 1. Still further, a plate-shaped member 8a whose linear expansion member is smaller than that of the substrate 1 may be provided on the entire surface side of an optical waveguide as shown in (b) of the same drawing, the plate-shaped member 8a may be provided on a part of the surface side of the optical waveguide as shown in (c) of the same drawing. Also, the size of the plate-shaped member 8a is not limited. Although not illustrated in the same drawing, a plate-shaped member 8b which is larger than the substrate 1 may be provided on the surface side of the optical waveguide.

Even in a case where the plate-shaped member 8a or 8b is thus provided, a warping force to make the substrate surface convex downward is applied to the arrayed waveguide diffraction grating 11 if the temperature of the arrayed waveguide diffraction grating 11 is higher than the temperature which becomes the reference temperature, for example, the normal temperature, as in the first preferred embodiment. Also, on the contrary, if the temperature of the arrayed waveguide diffraction grating 11 is lower than a temperature which becomes a reference temperature, a force which warps and makes the substrate surface convex upward will be applied to the array type waveguide diffraction grating 11. Therefore, where such plate-shaped members 8a or 8b as described above are provided, effects similar to those of the first preferred embodiment can be brought about by actions similar those of the first preferred embodiment.

Further, a plate-shaped member 8a whose linear expansion coefficient is larger than that of the substrate 1 may be provided on the rear side of the substrate 1, and a plate-shaped member 8b whose linear expansion coefficient is smaller than that of the substrate 1 may be provided on the surface side of the substrate 1.

Still further, in a case where such plate-shaped members 8a and 8b as described above are provided, the plate-shaped members 8a and 8b may be provided by adhering as in the first preferred embodiment, or may be provided by seizing instead of adhering.

Figure 6:
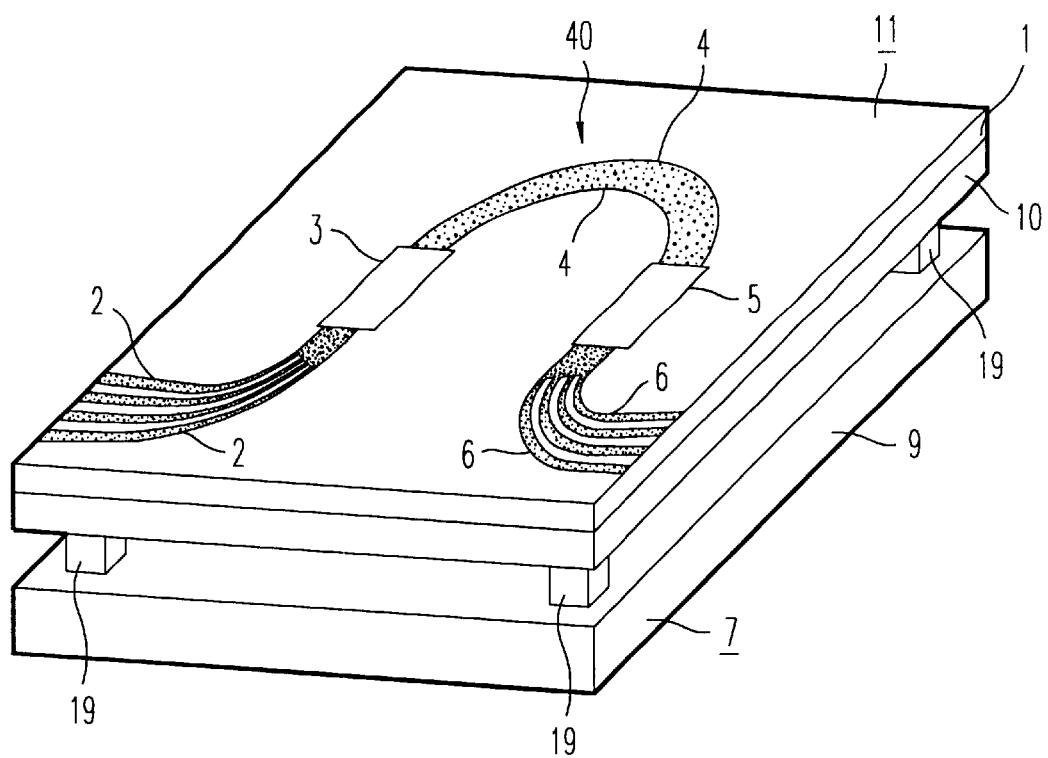
FIG. 6 is a configurational view showing the major parts of still another embodiment of an optical waveguide circuit according to the present invention.

In addition, in the second preferred embodiment, although the bimetal 7 is formed by bonding two types of plates 9 and 10 together, the bimetal 7 may be formed by bonding together three or more types of plates whose linear expansion coefficients are different from each other. For example, as shown in FIG. 6, a plate 19 is provided between different types of plates (in the same drawing, plates 9 and 10) as shown in, for example, FIG. 6, a bimetal 7 may be formed by bonding the plate 9 and plate 10, using a plate 19.

Still further, in the second preferred embodiment, although the bimetal 7 is provided on the rear side of the substrate 1, it may be provided on the surface side of an optical waveguide, or may be provided on both the surface side of an optical waveguide and the rear side of the substrate 1. Also, the area of the bimetal 7 may be larger or smaller than that of the substrate 1 or may be the same as that of the substrate 1. In addition, where bimetal 7 is provided, it may be provided on the surface side of the substrate and the surface side of the optical waveguide by seizing instead of adhering.

Figure 7:
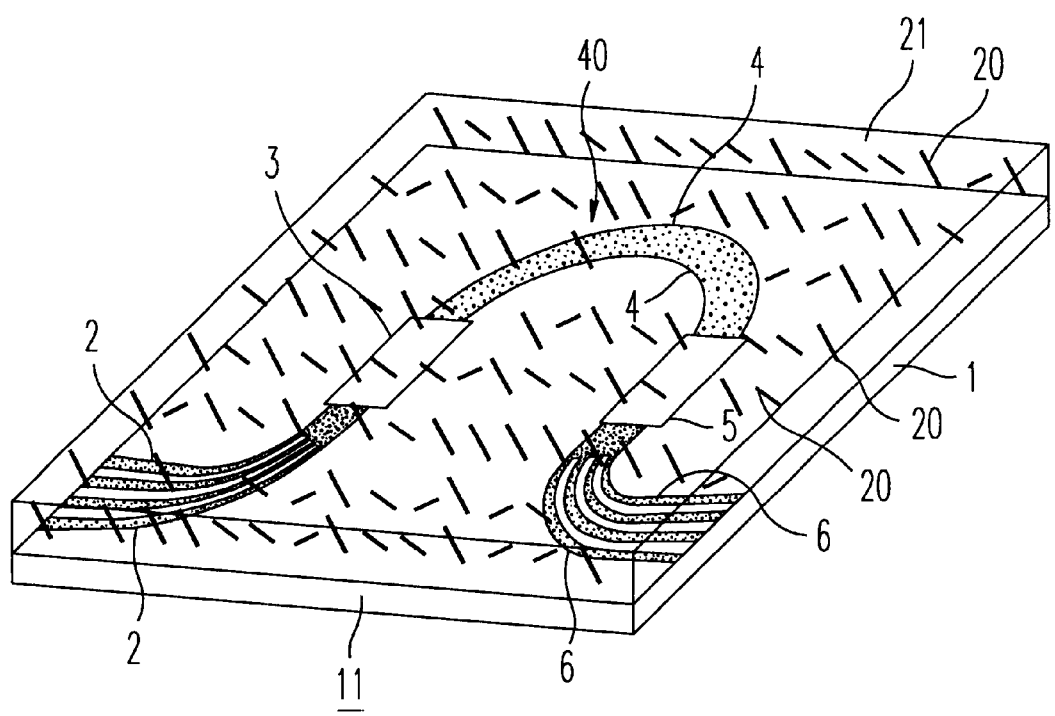
FIG. 7 is a configurational view showing the major parts of still another embodiment of an optical waveguide circuit according to the present invention, FIGS. 8(a)–(b) relate to still another embodiment of the optical waveguide circuit according to the invention, which is a cross-sectional view showing one example of optical waveguide circuit modules, in which the optical waveguide circuit is supported with the optical waveguide circuits zigzagged, by supporting members in a housing, FIGS. 9(a)–(b) relate to still another embodiment of the invention, which is a cross-sectional view showing one example of optical waveguide circuits where a high linear expansion coefficient material is provided between the housing and the optical waveguide, FIGS. 10(a)–(b) relate to another embodiment of a method for compensating the optical transmission wavelengths of an optical waveguide circuit according to the invention, which is a cross-sectional view showing one example of optical waveguide circuit modules in which an expansion material such as a gas, etc., is provided between the housing and the optical waveguide circuit, FIGS. 11(a)–(b) relate to still another embodiment of an optical waveguide circuit according to the invention, which is a cross-sectional view showing one example of optical waveguide circuit modules in which a stress is applied to the reference plane of the optical waveguide circuit in the vertical direction, FIGS. 12(a)–(b) relate to still another preferred embodiment of an optical waveguide circuit according to the invention, which is a cross-sectional view showing one example of optical waveguide circuit modules constructed so that a horizontal stress is applied to the substrate surface of the optical waveguide circuit.

Further, although, in the first preferred embodiment, the plate-shaped member 8a is provided on the rear side of the substrate 1 by adhering, a warp applying portion whose linear expansion coefficient is different from that of the substrate 1 may be formed directly on at least one of the rear side of the substrate 1 or the surface side of the optical waveguide. Such a warp applying portion may be formed of, for example, a resin or filler-contained resin whose linear expansion coefficient is smaller than the substrate 1. As one example thereof, FIG. 7 illustrates a warp applying portion in which a resin layer 21, having a filler 20 having a negative linear expansion coefficient mixed therein, having a small linear expansion coefficient is formed on the surface side of an optical waveguide. The filler 20 is formed of, for example, liquid crystal polymer.

The filler 20 having a negative expansion coefficient is contacted by a temperature rise, whereby the substrate of the abovementioned arrayed waveguide diffraction grating 11 is expanded by a temperature rise. Therefore, as in the arrayed waveguide diffraction grating 11 as shown in the same drawing, if a filler-contained resin layer 21 is provided on the surface side of an optical waveguide, the substrate surface is warped so as to become convex downward by the temperature rise as in the first preferred embodiment, and the substrate surface is warped so as to become convex upward by a temperature descent. Accordingly, in the case as described above, effects similar to those of the first embodiment can be brought about by actions similar to those thereof.

In addition, thus, in the case of forming a resin layer 21 having a filler 20 mixed therein, the area of the filler-contained resin layer 21 may be made larger or smaller than that of the substrate 1 or may be the same as that of the substrate 1. Also, an arrayed waveguide diffraction grating 11 having a resin, whose linear expansion coefficient is smaller than that of the substrate 1, formed on the surface of the optical waveguide can bring about effects similar to the above by actions similar to the above. In this case, the area of a resin layer whose linear expansion coefficient is smaller than that of the substrate 1 may be made smaller or larger than that of the substrate 1 or may be the same as that of the substrate 1.

Furthermore, a resin whose linear expansion coefficient is larger than that of the substrate 1 or a filler-contained resin whose linear expansion coefficient is larger than that of the substrate 1 may be provided at the surface side of the optical waveguide instead of providing a resin or a filler-contained resin whose linear expansion coefficient is smaller than that of the substrate 1. In such a case, similar effects can be brought about by actions similar to those in the above.

In addition, instead of the resin, a metal film whose linear expansion coefficient is lager than that of the substrate 1 may be formed on the rear side of the substrate 1 by a spattering method, vacuum deposition method, CVD method, or a film molding method such as an electric field plating method.

Also, in the second preferred embodiment, although the stress applying means employs bimetal 7 as a temperature dependent warp changing portion, the temperature dependent warp applying portion may be formed of a shape memory metal whose outer profile may change in compliance with a temperature change. Even in a case where the temperature dependent warp applying portion is formed of a shape memory metal, the substrate surface is warped, depending on a temperature, thereby reducing the temperature dependency of the center wavelength of transmission of the respective lights outputted from the optical output waveguide 6, whereby effects similar to those of the second preferred embodiment can be brought about.

Figure 8A:
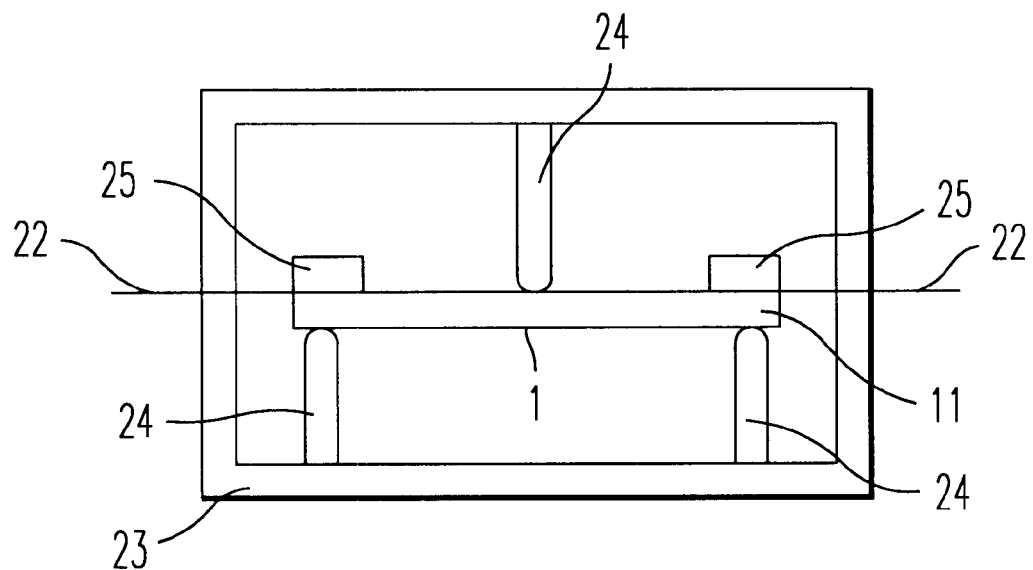
Figure 8B:
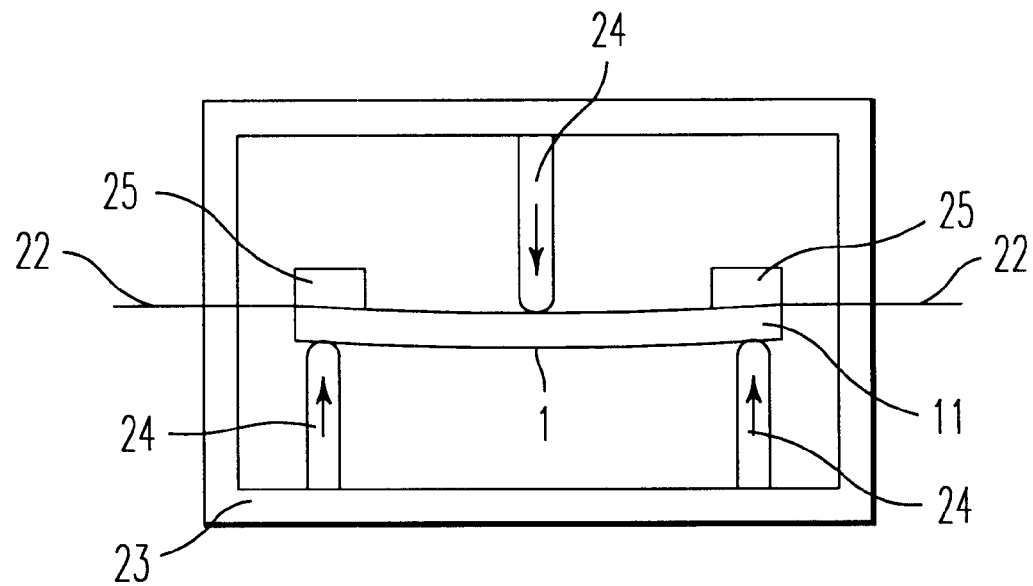

Still further, the center wavelength of light transmission of an arrayed waveguide diffraction grating may be compensated by such a construction as shown in, for example, FIG. 8. That is, the arrayed waveguide diffraction grating 11 is accommodated in a housing 23 having a smaller linear expansion coefficient. And, supporting members 24 having a higher linear expansion coefficient are disposed at both end sides of an arrayed waveguide diffraction grating and at the central side alternately, whereby the arrayed waveguide diffraction grating 11 is supported by the supporting members 24 to make it into a module.

Utilizing that the supporting members 24 expand greater than the housing 23 in line with a temperature rise, the construction compensates the center wavelength of light transmission of the arrayed waveguide diffraction grating 11. That is, the arrayed waveguide diffraction grating 11 is disposed so that the substrate comes underside, and the diffraction grating 11 is warped so as to become convex downward, as shown in (b) of the same drawing, from the state shown in (a) of the same drawing in line with a temperature rise. Further, utilizing that the supporting members 24 are contracted greater than the housing 2 in line with a temperature descent, the array waveguide diffraction grating 11 is warped so as to become convex upwards contrary to the state shown in (b) of the same drawing.

As described above, the arrayed waveguide diffraction grating 11 can be warped as in the first and second preferred embodiments in line with a temperature rise and a temperature descent. For this reason, in a case where the construction shown in FIG. 8 is employed, the center wavelength of light transmission of the arrayed waveguide diffraction grating 11 is compensated for temperature by actions similar to those in the first and second preferred embodiments. In addition, i the same drawing, 22 indicates an optical fiber, and 25 indicates an optical fiber clamping member.

Figure 9A:
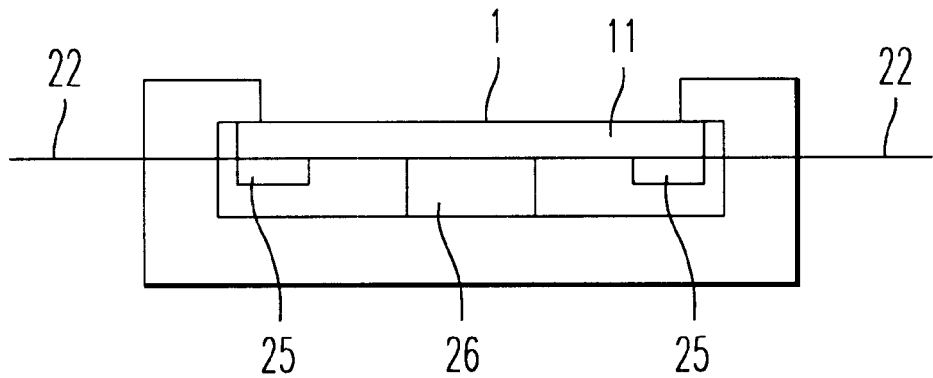
Figure 9B:
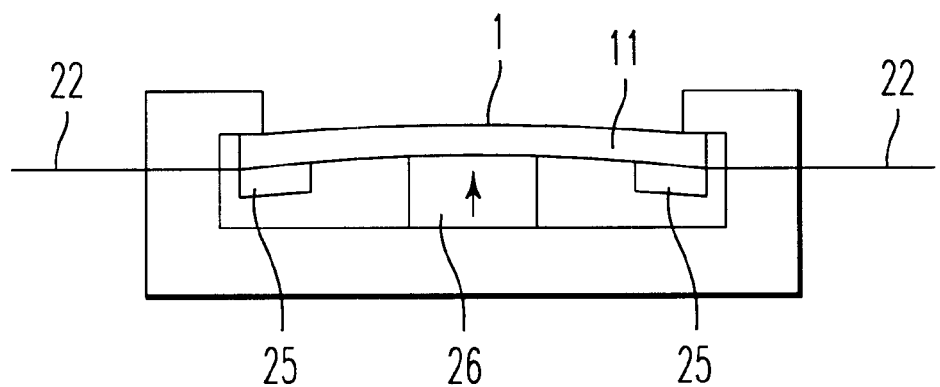

Also, as shown in FIG. 9, a material 26 having a high linear expansion coefficient is provided in a housing 23, wherein an arrayed waveguide diffraction grating 11 may be disposed so that the substrate 1 comes upside. In this case, the material 26 having a high linear expansion coefficient expands in line with a temperature rise to cause the arrayed waveguide diffraction grating 11 to be warped so as to become convex upward, and the material 26 having a high linear expansion coefficient is caused to contract in line with a temperature descent, whereby the arrayed waveguide diffraction grating 11 is warped so as to become convex downward. If so, as in the construction shown in FIG. 8, since the arrayed waveguide diffraction grating 11 is warped in line with a temperature change, the temperature dependency of the center wavelength of respective light transmission in the light transmission characteristics of respective lights outputted from the respective output waveguides 6 can be reduced.

Figure 10A:
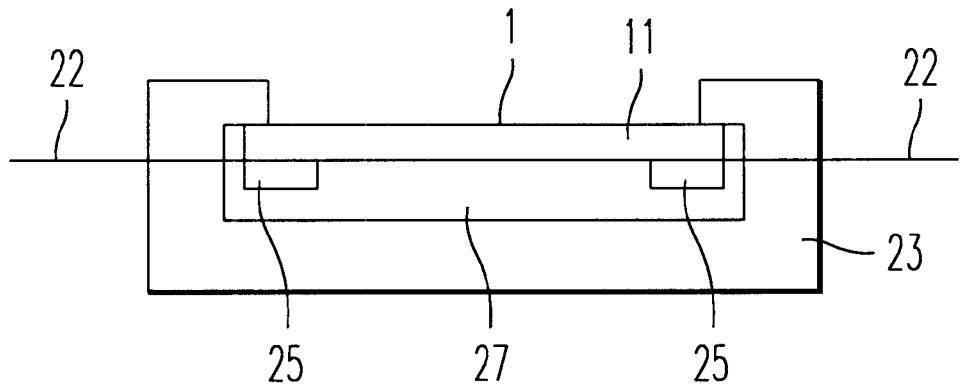
Figure 10B:
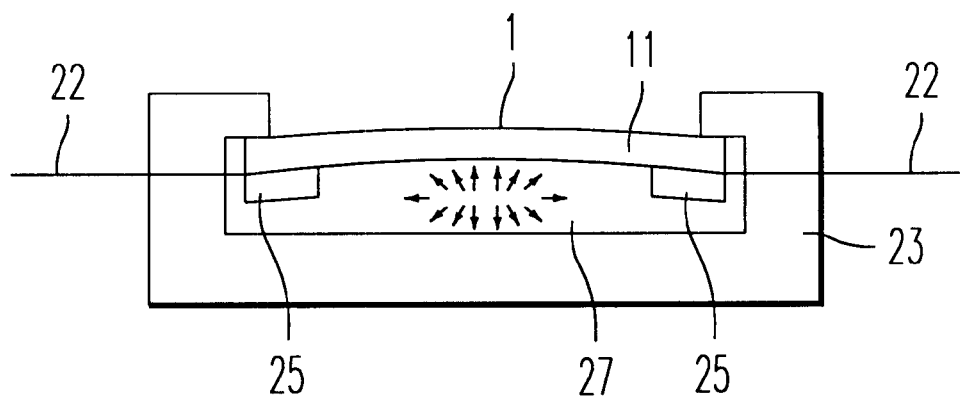
Figure 11A:
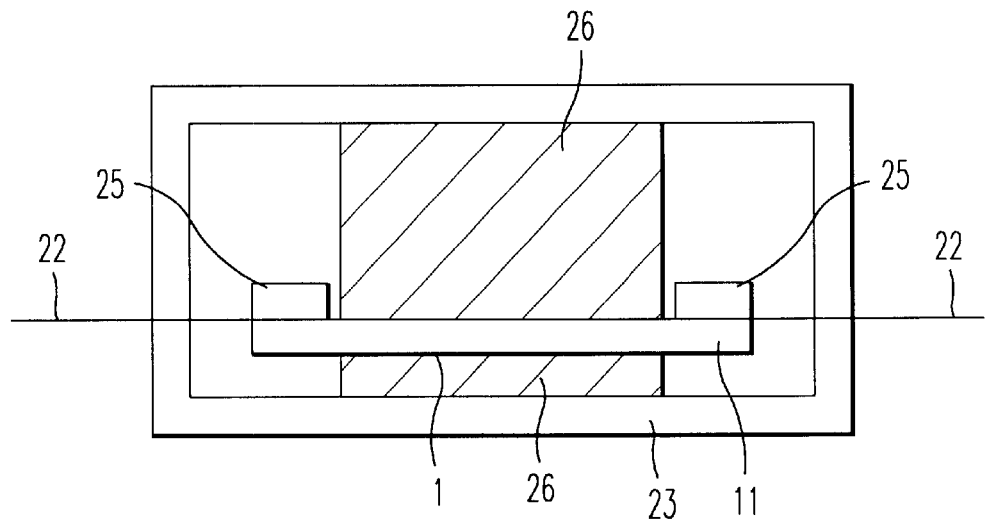
Figure 11B:
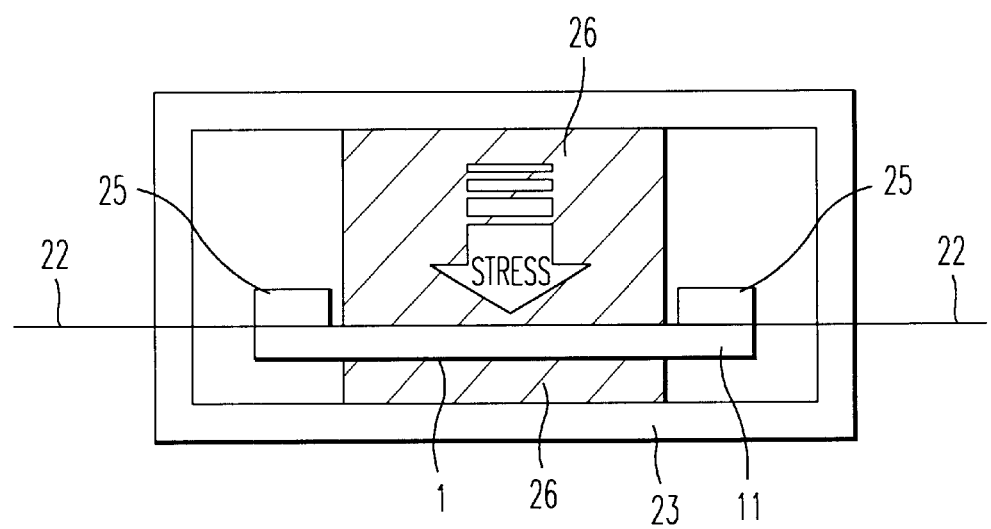

Further, as shown in FIG. 10, a gas, liquid or gel-like expanding material 27 may be filled up between the housing 23 and the arrayed waveguide diffraction grating 11 instead of the material 26 having a high linear expansion coefficient. Thereby, the expanding material 27 expands in line with a temperature rise to cause the arrayed waveguide diffraction grating 11 to be warped so as to become convex upward, and the expanding material 27 contracts in line with a temperature descent to warp the arrayed waveguide diffraction grating 11 so as to become convex downward. Also, in this case, as shown in the same drawing, the arrayed waveguide diffraction grating 11 is disposed so that the substrate 1 comes upside. Thereby, as in the constructions as shown in FIG. 8 and FIG. 9, since the arrayed waveguide diffraction grating 11 can be warped, it is possible to reduce the temperature dependency of the center wavelength of respective light transmission in the transmission characteristics of the respective lights outputted from the respective optical output waveguides 6.

Further, in a method for compensating light transmission wavelengths of an optical waveguide circuit of the invention, a warp applying means for warping the substrate surface is not necessarily provided as only a stress applying means. For example, a pressure applying means which applies pressure in the direction perpendicular to the substrate surface is provided as a stress applying means, whereby the temperature dependency of the center wavelength of respective light transmission in the transmission characteristics of the respective lights outputted from the respective optical output waveguides 6 may be reduced.

When employing the construction, an arrayed waveguide diffraction grating 11 accommodated in the housing 23 is placed between the materials 26 having a high linear expansion coefficient so that the upside and downside thereof are nipped, and the material 26 is caused to intervene between the housing 23 and the arrayed waveguide diffraction grating 11 without any clearance/And, such pressure as shown by the arrow in (b) of the same drawing is applied to the arrayed waveguide diffraction grating 11 when a temperature rises, wherein a lowering of the refractive index of the array waveguide 40 of the arrayed waveguide diffraction grating 11 is produced by the pressure. Thereby, the temperature dependency of the center wavelength of transmission of respective lights outputted from the respective optical output waveguides 6 can be reduced in the arrayed waveguide diffraction grating 11 as in the respective preferred embodiments.

Also, the arrayed waveguide diffraction grating 11 accepts upward oriented pressure which is contrary to the stress arrow shown in the same drawing when the temperature descends. Accordingly, in the arrayed waveguide diffraction grating 11, the refractive index of the array waveguide 40 is increased contrary to the above description, and the temperature dependency of the center wavelength of transmission of the respective lights can be reduced.

Also, in order to reduce the temperature dependency of the center wavelength of respective light transmission in the optical transmission characteristics of the respective lights outputted from the respective optical output waveguides 6, a horizontal direction stress applying means which applies a tensile force or a compression force to the substrate surface in the horizontal direction may be provided as a stress applying means.

Figure 12A:
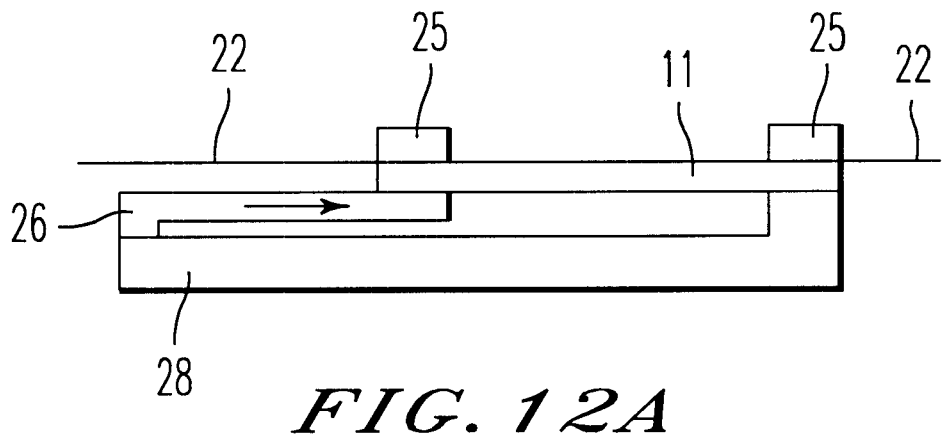

In a case where the construction is employed, as shown in, for example, FIG. 12(a), an arrayed waveguide diffraction grating 11 is fixed on a material 28 having a low linear expansion coefficient and a material 26 having a high linear expansion coefficient with a horizontal direction tensile force applied thereto in advance. Thereby, as shown in (b) of the same drawing, the tensile force applied to the arrayed waveguide diffraction grating 11 is relieved in line with a temperature rise, whereby the refractive index of the array waveguide 40 is decreased. Also, the tensile force applied to the arrayed waveguide diffraction grating 11 is strengthened in line with a temperature descent contrary to the state shown in (b) of the same drawing, whereby the refractive index of the array waveguide 40 is increased. Therefore, the temperature dependency of the center wavelength of transmission of respective lights outputted from the respective optical output waveguides 6 can be reduced by changes in the refractive index.

Figure 12B:
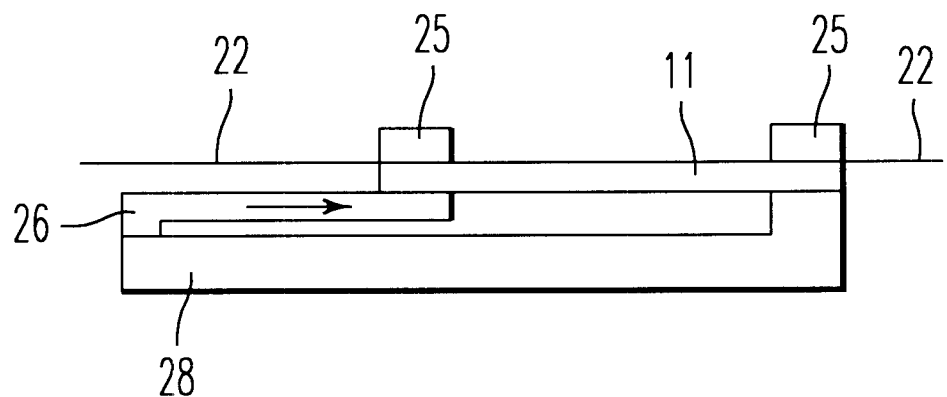
Figure 13:
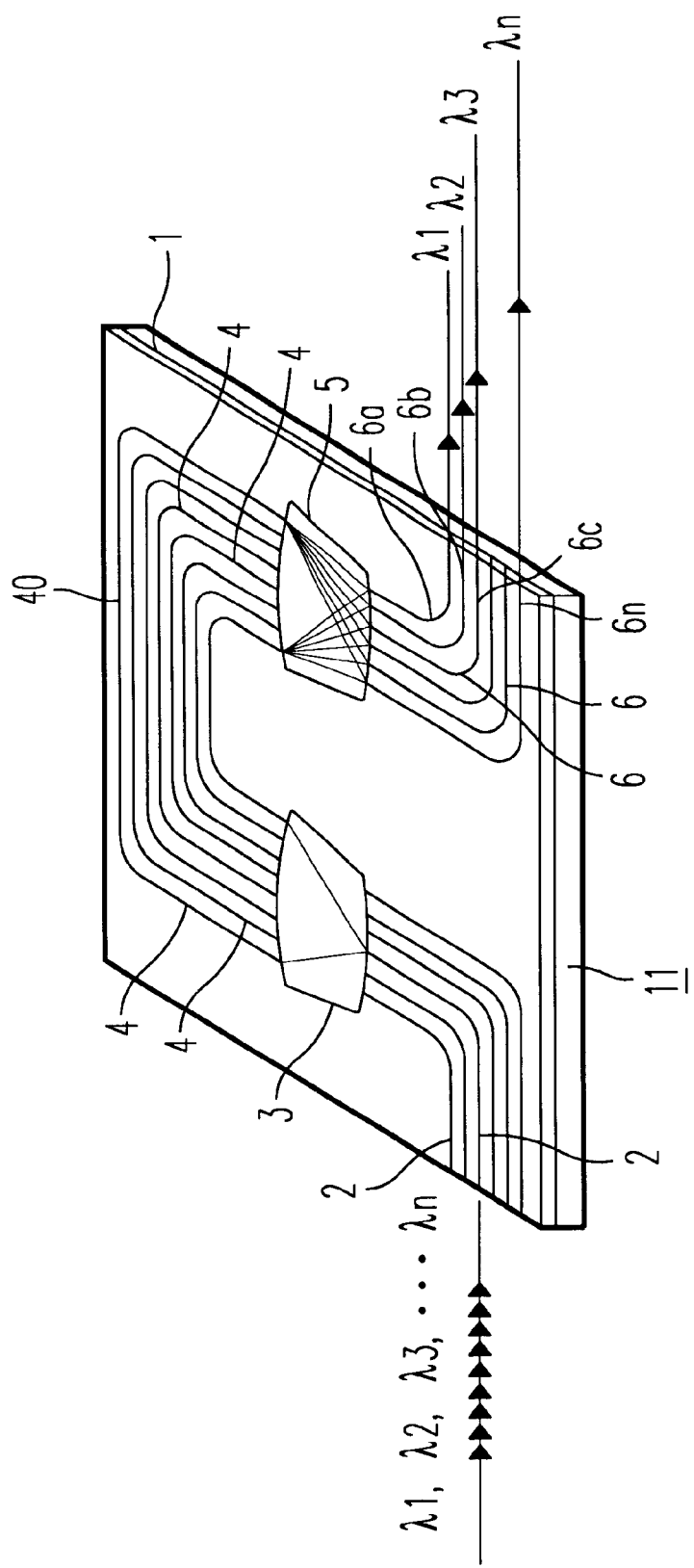
FIG. 13 is an explanatory view showing a construction of an arrayed waveguide diffraction grating together with actions of wavelength multiplexing and division.
Figure 14A:
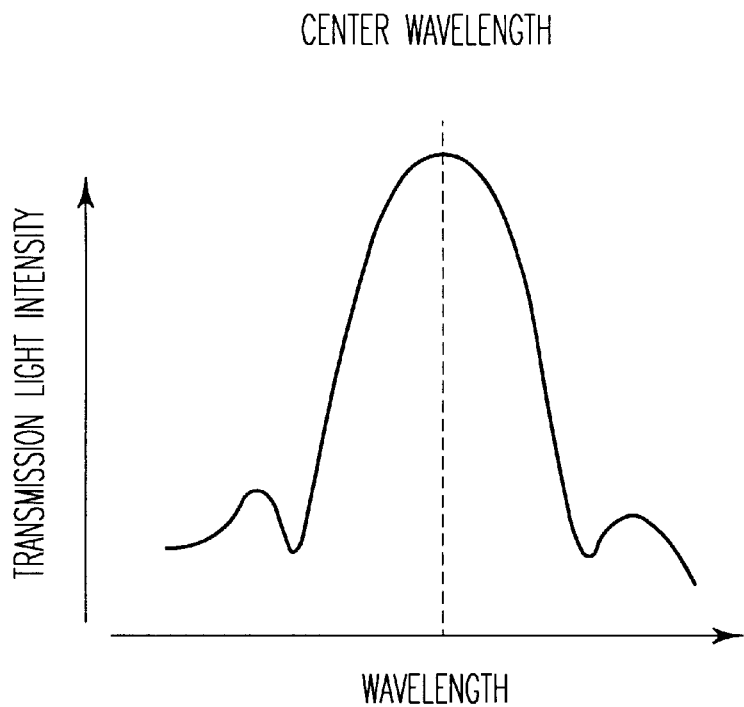
FIG. 14 is a graph showing an example of light transmission characteristics of the arrayed waveguide diffraction grating.
Figure 14B:
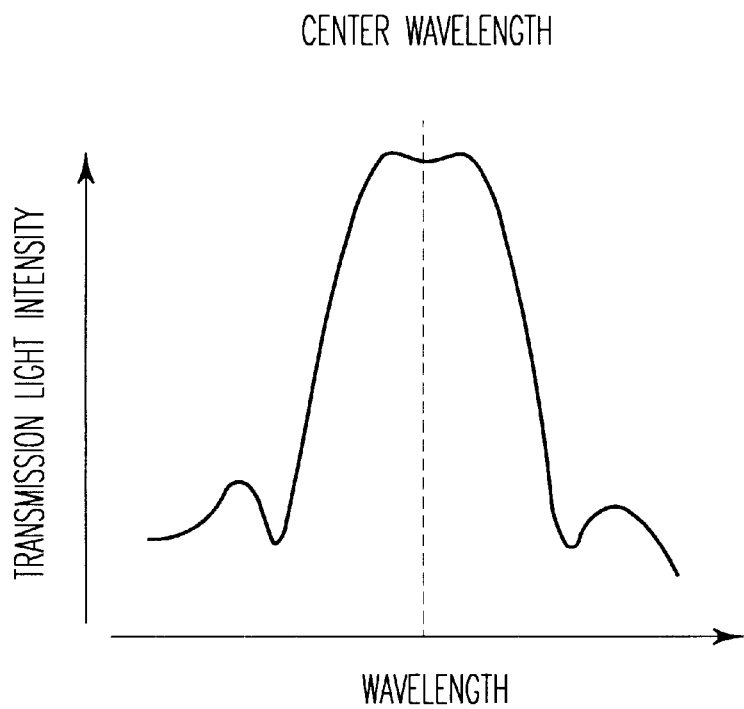
Figure 15:
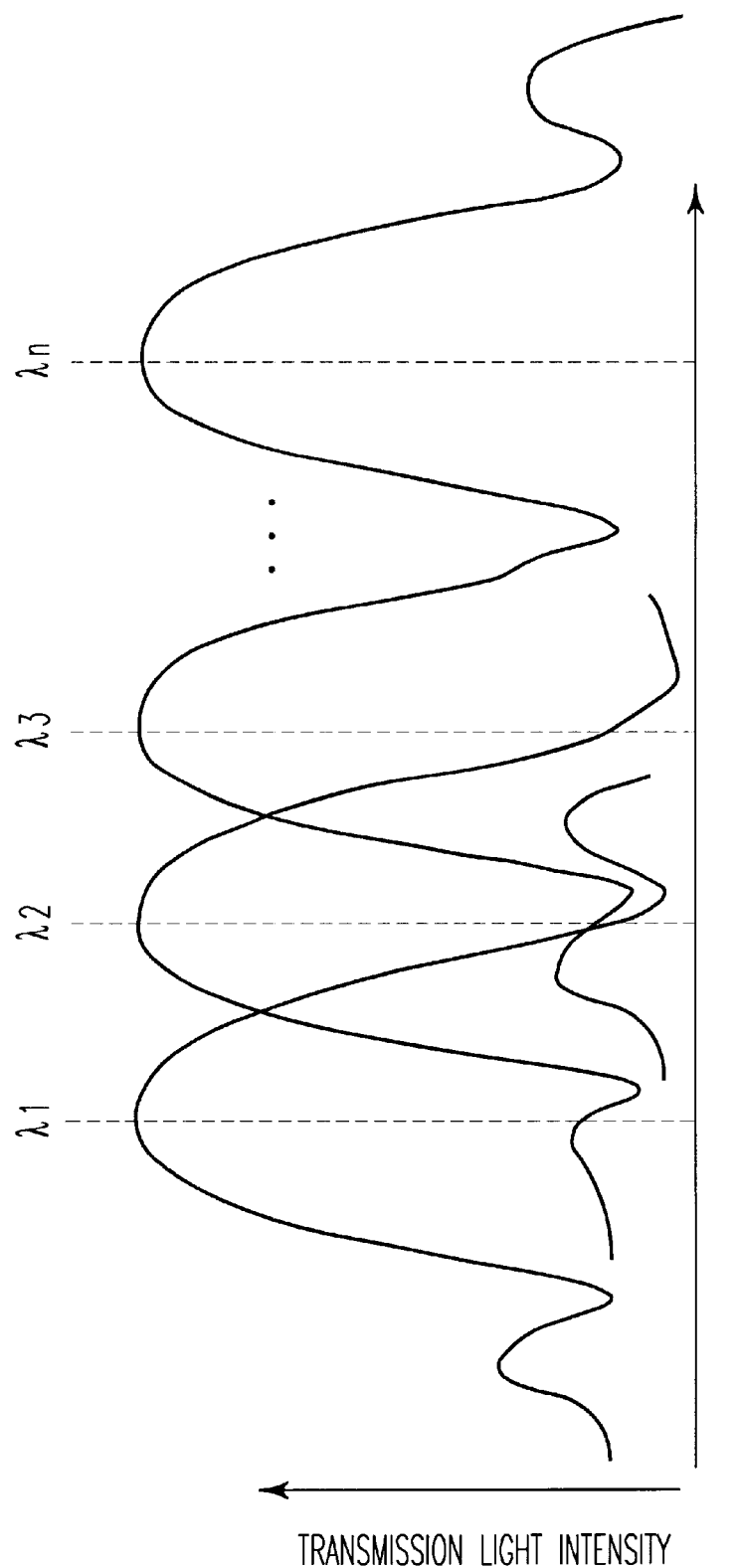
FIG. 15 is a graph showing light transmission characteristics of respective lights outputted from the respective optical output waveguide of the arrayed waveguide diffraction grating.
Figure 16:
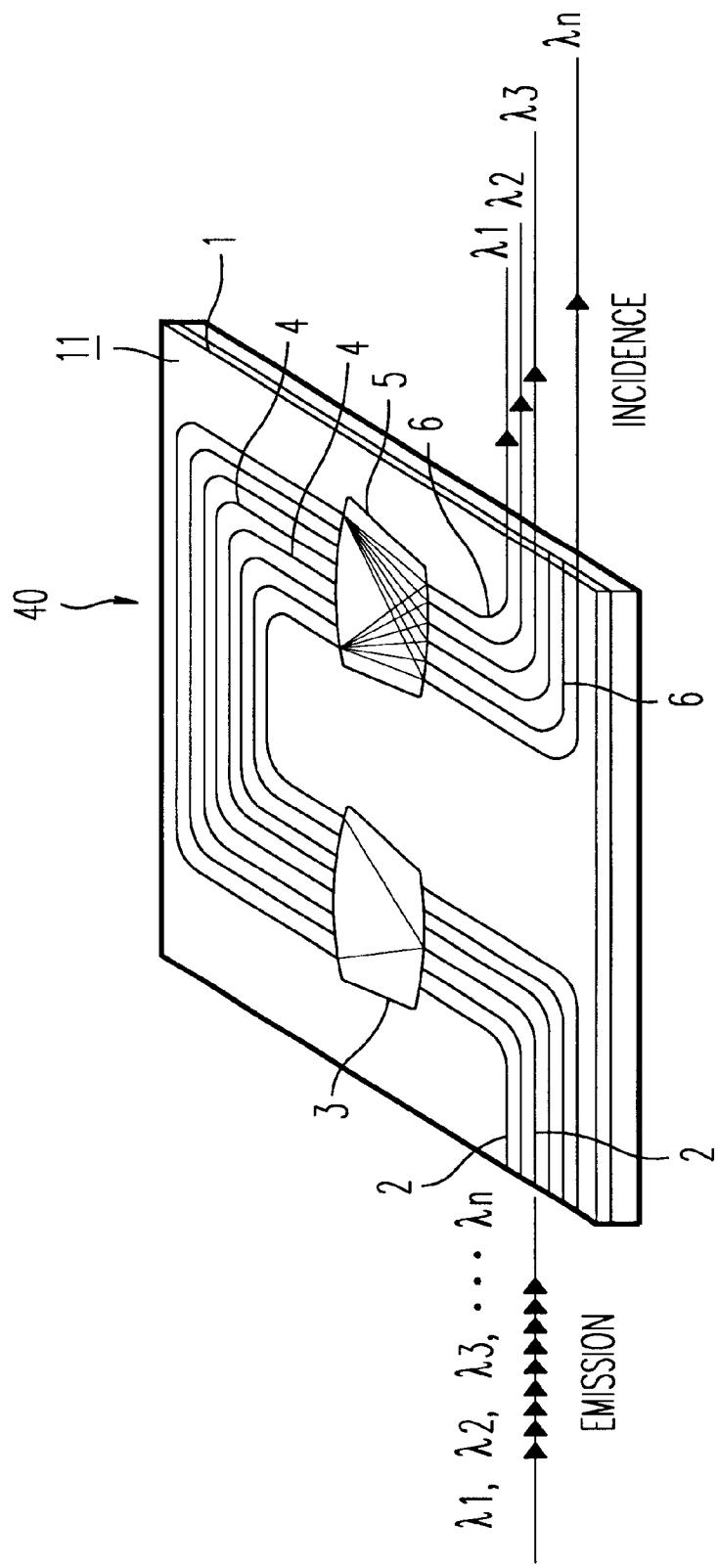
FIG. 16 is an explanatory view showing a construction of the arrayed waveguide diffraction grating along with actions of wavelength multiplexing and division.
Figure 17:
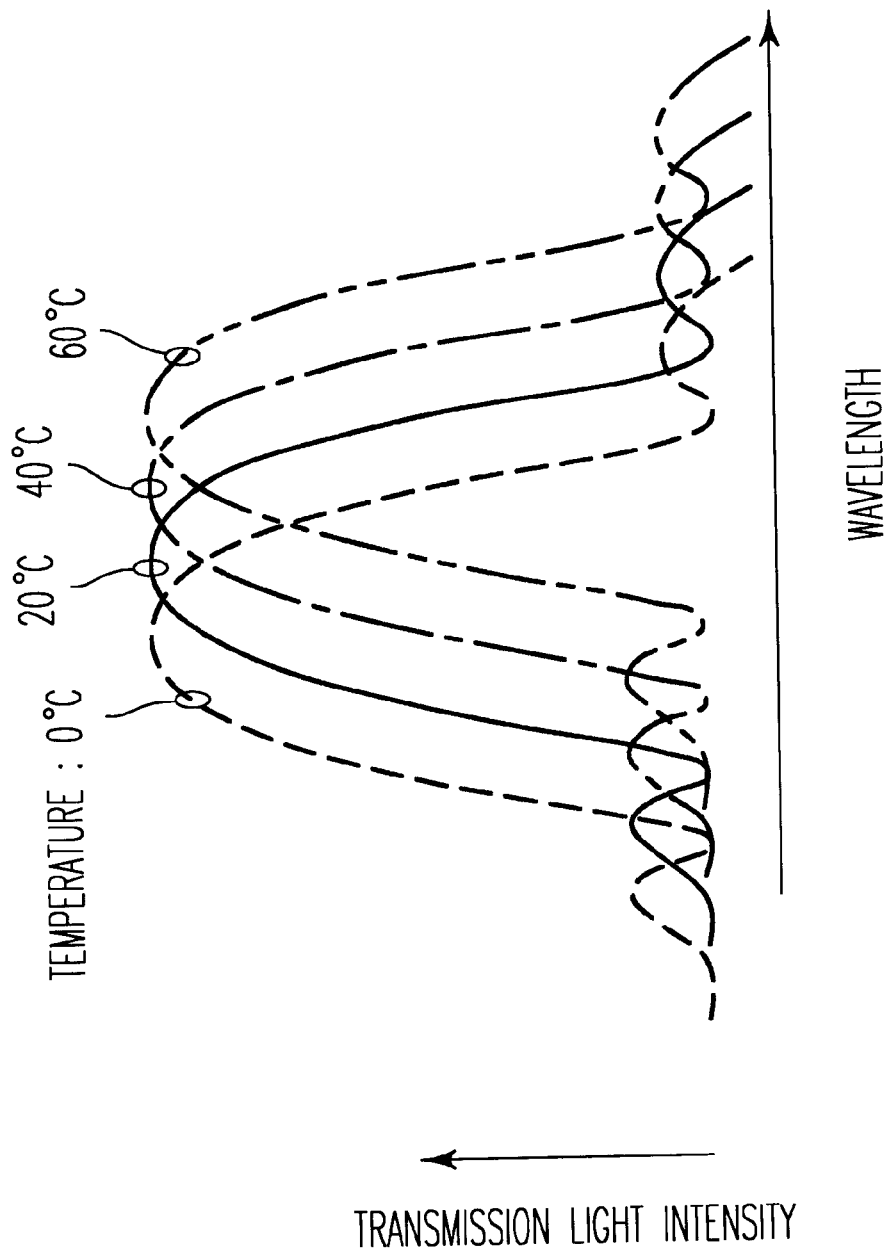
FIG. 17 is a graph showing temperature dependency of light transmission characteristics of lights outputted from one optical output waveguide of the arrayed waveguide diffraction grating.
Figure 18:
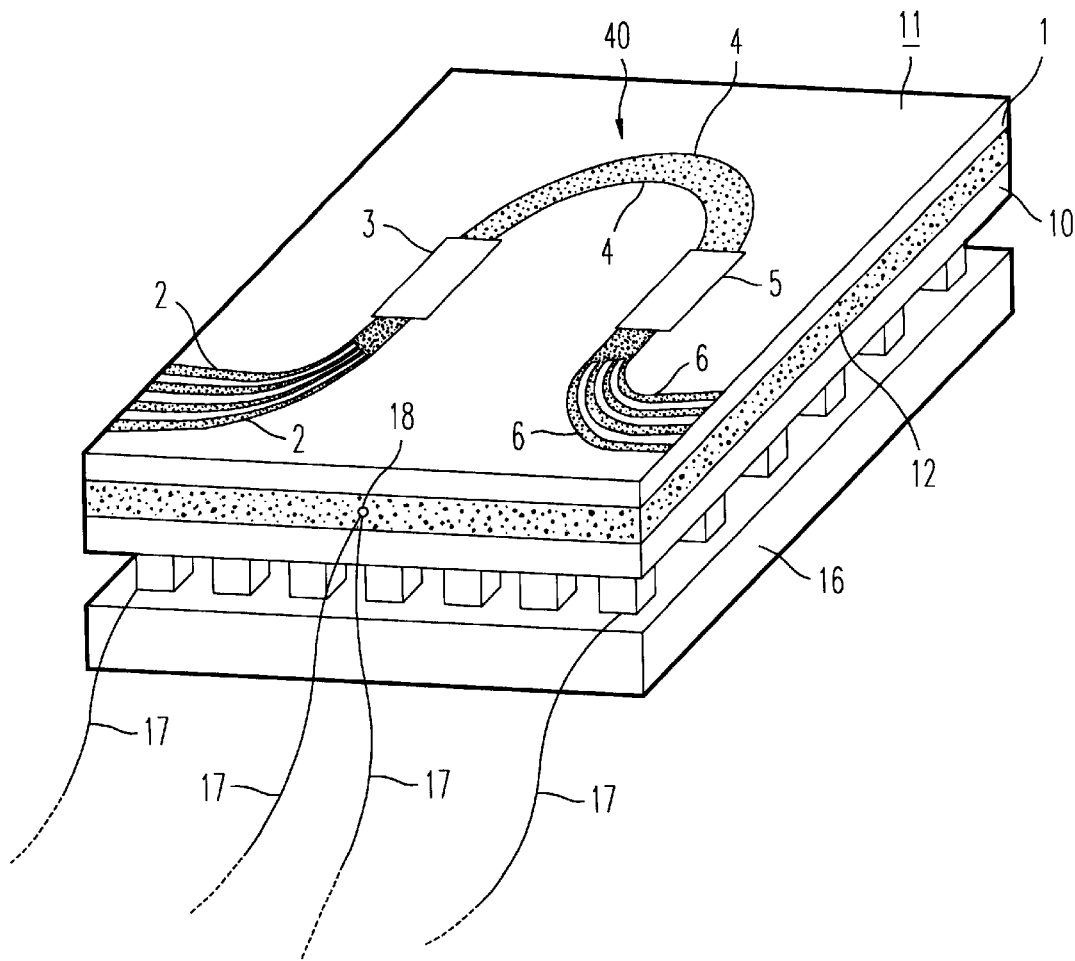
FIG. 18 is an explanatory view showing a prior art arrayed waveguide diffraction grating provided with a temperature control circuit.
Figure 19:
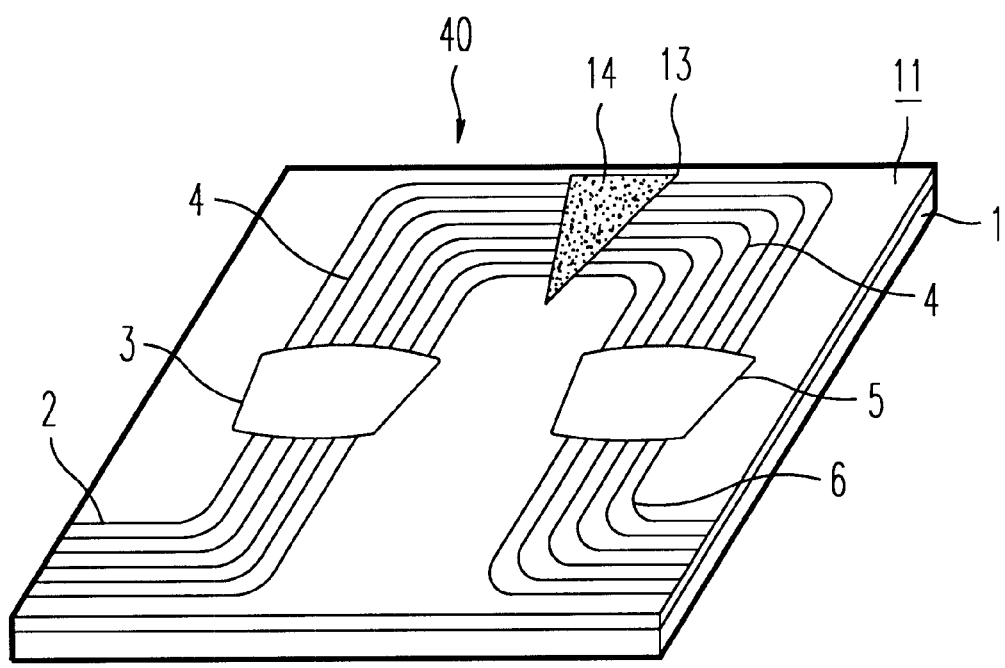
FIG. 19 is an explanatory view showing one example of a conventionally proposed arrayed waveguide diffraction grating to reduce the temperature dependency of the light transmission characteristics.

In addition, it may be actually difficult for the example as shown in FIG. 12 to be applied to an arrayed waveguide diffraction grating 1 having a substrate 1 formed of silicon single crystal. However, recently, an arrayed waveguide diffraction grating 11 in which the substrate 1 is formed of a flexible material like a polyimide sheet, etc. has been developed, wherein if the example is applied to such an arrayed waveguide diffraction grating, the temperature dependency of the center wavelength of light transmission can be very effectively reduced.

Still further, in the invention, the following constructions may be applicable in order that the center wavelength of the respective light transmission of the arrayed waveguide diffraction grating is made into a grid wavelength as a predetermined wavelength in a predetermined set temperature or set temperature range (for example, the set temperature is 25° C. or the set temperature range is from 20° C. through 25° C.)

First, a stress applying means (for example, bimetal 7, etc.,) is prepared, which applies a stress to an array waveguide 40, or the array waveguide 40 and the input side slab waveguides 3 and output side slab waveguides 5 so that the center wavelength of respective light transmission is made into the grid wavelength in the above set temperature or within the set temperature range, And, the abovementioned stress applying means is provided in the arrayed waveguide diffraction grating 11 at a temperature atmosphere in which the stress applied from the stress applying means to an array waveguide 40, or the array waveguide 40, and the input side slab waveguides 3 and output side slab waveguides 5 becomes zero. If so constructed, it is possible that the center wavelength of respective light transmission can be made into almost the set wavelength in the abovementioned temperature or within the set temperature range.

Still further, an optical waveguide circuit and a method for compensating the light transmission wavelength according to the invention are not necessarily a circuit for reducing the temperature dependency of the center wavelength of light transmission and a method therefor. That is, in the arrayed waveguide diffraction grating 11, when the center wavelengths of transmission of lights outputted from the optical output waveguides 6 are deviated from respective set wavelengths of the abovementioned predetermined grid wavelength, etc., corresponding thereto, the shifts are produced to such a degree that the center wavelengths thereof shift by an equal distance from each other.

Therefore, where such shifts are produced in a use temperature of the arrayed waveguide diffraction grating 11, a stress applying means is provided, which applies a stress to an array waveguide 40, or the array waveguide 40 and the input side slab waveguides 3 and output side slab waveguides 5 in the direction of reducing the shift amount of wavelengths. Thereby, it is possible to reduce the shift in the center wavelengths of respective light transmission, and, for example, to allow the center wavelengths to come near the abovementioned grid wavelength, etc. Also, a stress applying means employed for the method may be constructed by using the respective means described with reference to FIG. 1, FIG. 3 and FIG. 5 through FIG. 12.

In addition, in the respective preferred embodiments, the optical waveguide circuit was an arrayed waveguide diffraction grating 11 in either case. However, the optical waveguide circuit to which the invention applies is not particularly limited. It may be adequately determined. For example, the present invention may be applicable to compensate fluctuations of the center wavelength of transmission waves of a fiber grating formed of PLC or the center wavelength of reflection waves thereof. Also, the invention may be widely applicable to compensate fluctuations of oscillating wavelengths of a ring laser formed of PLC, fluctuations in the center wavelength of interference wavelengths in a Mach-Zehnder interferometer, and fluctuations of the center wavelengths of a Mach-Zehnder interference type wave synthesizer, and may be applicable as a method for compensating the fluctuations described above.

Industrial Applicability

As described above, without any large-sized apparatus, the present invention is capable of compensating light transmission wavelengths of an optical waveguide circuit such as an arrayed waveguide diffraction grating to a set wavelength and compensating temperature fluctuations of the light transmission wavelengths. Therefore, the invention compensates light transmission wavelengths of an optical waveguide circuit used as a wavelength filter and an optical wavelength synthesizing and dividing device, etc., which are used for optical transmissions, whereby the optical waveguide circuit can be made suitable for optical transmissions.

What is claimed is:

1. An optical waveguide circuit, in which a first slab waveguide is connected to the emitting side of one of more optical waveguides juxtaposed to each other, an array waveguide, consisting of a plurality of waveguides whose lengths are different from each other, which propagates lights led out from said first slab waveguide is connected to the emitting side of said first slab waveguide, a second slab waveguide is connected to the emitting side of said array waveguide, a waveguide construction, consisting of a plurality of optical output waveguides juxtaposed to each other, is formed on a substrate at the emitting side of said second slab waveguide, having an optical dividing feature for dividing lights of a plurality of wavelengths from lights having a plurality of wavelengths different from each other, which are inputted from said optical input waveguides, and outputting the same from respective optical output waveguides, light transmission features of the respective lights outputted from the respective corresponding optical output waveguides having the center wavelengths of light transmission different from each other in at least a predetermined wavelength area, and compensating a temperature dependency fluctuation of the center wavelengths of the light transmission; wherein by providing said array waveguide or said array waveguide and the first and second slab waveguides with a stress applying means for applying a stress dependent on a temperature in the direction of reducing the temperature dependency fluctuation of the center wavelengths of said respective light transmissions, the temperature dependency fluctuation of the center wavelengths of said respective light transmissions is reduced.

2. An optical waveguide circuit as set forth in claim 1, wherein the temperature dependency fluctuation of the center wavelengths of the respective light transmissions in a temperature range from 0° C. through 70° C. is reduced to 0.3 nm or less.

3. An optical waveguide as set forth in claim 1, wherein a reference temperature is measured, at which the center wavelengths of said respective light transmissions becomes a predetermined wavelength, a stress applying means is provided, in which a stress applied to the array waveguide or said array waveguide, and the first and second slab waveguides becomes zero, and the absolute figure of the stress is increased in line with an actual temperature shifting from said reference temperature, and said stress applying means is provided in the optical waveguide circuit in an atmosphere of said reference temperature, wherein a shift amount of the center wavelengths of said respective light transmissions from said set wavelength is kept within a shift amount predetermined in a predetermined temperature range including at least said reference temperature.

4. An optical waveguide circuit as set forth in claim 1, wherein a reference temperature is measured, at which the center wavelengths of said respective light transmissions becomes a predetermined wavelength, a stress applying means is provided, in which a stress applied to the array waveguide or said array waveguide, and the first and second slab waveguides becomes zero, and the absolute figure of the stress is increased in line with an actual temperature shifting from said reference temperature, and said stress applying means is provided in the optical waveguide circuit in an atmosphere of said reference temperature, wherein the center wavelengths of said respective light transmissions are made into almost said set wavelengths in a predetermined temperature range including at least said reference temperature.

5. An optical waveguide as set forth in claim 1, wherein a stress applying means is provided, which applies a stress to an array waveguide or said array waveguide and the first and second slab waveguides in said set temperature so that the center wavelengths of said respective light transmissions become set wavelengths predetermined in a predetermined set temperature, and said stress applying means is provided in said optical waveguide circuit at an atmosphere temperature where the stress applied from said array waveguide or said array waveguide, and the first and second slab waveguides become zero, wherein the center wavelengths of said respective light transmissions are made into almost said set wavelengths in said set temperature.

6. An optical waveguide circuit, in which a first slab waveguide is connected to the emitting side of one of more optical waveguides juxtaposed to each other, an array waveguide, consisting of a plurality of waveguides whose lengths are different from each other, which propagate lights led out from said first slab is connected to the emitting side of said first slab waveguide, a second slab waveguide is connected to the emitting side of said array waveguide, a waveguide construction, consisting of a plurality of optical output waveguides juxtaposed to each other, is formed on a substrate at the emitting side of said second slab waveguide, having an optical dividing feature for dividing lights of a plurality of wavelengths from lights having a plurality of wavelengths different from each other, which are inputted from said optical input waveguides, and outputting the same from respective optical output waveguides, light transmission features of the respective lights outputted from the respective corresponding optical output waveguides having the center wavelengths of light transmission different from each other in at least a predetermined wavelength area, and compensating a temperature dependency fluctuation of the center wavelengths of the light transmission; wherein, when the center wavelengths of said light transmissions, respectively, shifts by an almost equal shift amount of wavelength from the respective predetermined wavelengths corresponding to the center wavelengths of the respective light transmissions, a shift of the center wavelengths of said respective light transmissions is reduced by providing a stress applying means which applies a stress in the direction of reducing said shift amount of wavelength to said array waveguide, and said array waveguide, and the first and second slab waveguides.

7. An optical waveguide circuit as set forth in any one of claims 1 through 6, wherein a warp applying means which applies a stress to an optical waveguide by warping said substrate is provided as a stress applying means.

8. An optical waveguide circuit as set forth in any one of claims 1 through 6, wherein a pressure applying means which applies pressure to said substrate in the vertical direction is provided as a stress applying means.

9. An optical waveguide as set forth in any one of claims 1 through 6, wherein a horizontal direction stress applying means which applies a tensile force or a compression force to said substrate in the horizontal direction is provided as a stress applying means.

10. An optical waveguide circuit as set forth in claim 7, wherein a warp applying portion whose linear expansion coefficient is different from that of said substrate is provided with at least one of either the surface side of said optical waveguide or the rear side of the substrate to form a warp applying means.

11. An optical waveguide circuit as set forth in claim 10, wherein a resin layer or a filler-contained resin layer is formed with at least one of either the surface side of said optical waveguide or the rear side of the substrate as a warp applying portion.

12. An optical waveguide circuit as set forth in claim 7, wherein a plate-shaped member whose linear expansion coefficient is different from that of said substrate is adhered to or welded to at least one of either the surface side of the optical waveguide or the rear side of the substrate to form a warp applying means.

13. An optical waveguide circuit as set forth in claim 7, wherein a temperature dependent warp changing portion in which the warp amount is changed on the basis of a temperature is provided with at least one of either the surface side of the optical waveguide or the rear side of the substrate to form a warp applying means.

14. An optical waveguide circuit as set forth in claim 13, wherein a plurality of plates whose linear expansion coefficients are different from each other are bonded to form a temperature dependent warp changing portion.

15. An optical waveguide circuit as set forth in claim 13, wherein a temperature dependent warp changing portion is formed of a shape memory alloy plate.

16. A method for compensating a light transmission wavelength of an optical waveguide circuit, comprising the steps of:
    connecting a first slab waveguide to the emitting side of one of more optical waveguides juxtaposed to each other,
    connecting an array waveguide consisting of a plurality of waveguides whose lengths are different from each other, which propagates lights led out from said first slab, to the emitting side of said first slab waveguide,
    connecting a second slab waveguide to the emitting side of said array waveguide,
    forming a waveguide construction consisting of a plurality of optical output waveguides juxtaposed to each other, on a substrate at the emitting side of said second slab waveguide,
    providing an optical dividing feature for dividing lights of a plurality of wavelengths from lights having a plurality of wavelengths different from each other, which are inputted from said optical input waveguides, and outputting the same from respective optical output waveguides, and
    causing a light transmission feature of the respective lights outputted from the respective optical output waveguides to have the center wavelengths of light transmission different from each other in at least a predetermined wavelength area, and
    compensating a temperature dependency fluctuation of the center wavelengths of the light transmission;
    wherein by providing said array waveguide or said array waveguide and the first and second slab waveguides with a stress applying means for applying a stress dependent on a temperature in the direction of reducing the temperature dependency fluctuation of the center wavelengths of said respective light transmissions, the temperature dependency fluctuation of the center wavelengths of said respective light transmissions is reduced.

17. A method for compensating a light transmission wavelength of an optical waveguide circuit as set forth in claim 16, wherein the temperature dependency fluctuation of the center wavelengths of the respective light transmissions in a temperature range from 0° C. through 70° C. is reduced to 0.3 nm or less.

18. A method for compensating a light transmission wavelength of an optical waveguide circuit as set forth in claim 16, wherein a reference temperature is measured, at which the center wavelengths of said respective light transmissions become a predetermined wavelength, a stress applying means is provided, in which a stress applied to the array waveguide or said array waveguide, and the first and second slab waveguides becomes zero, and the absolute figure of the stress is increased in line with an actual temperature shifting from said reference temperature, and said stress applying means is provided in the optical waveguide circuit in an atmosphere of said reference temperature, wherein a shift amount of the center wavelengths of said respective light transmissions from said set wavelength is kept within a shift amount predetermined in a predetermined temperature range including at least said reference temperature.

19. A method for compensating a light transmission wavelength of an optical waveguide circuit as set forth in claim 16, wherein a reference temperature is measured, at which the center wavelengths of said respective light transmissions become a predetermined wavelength, a stress applying means is provided, in which a stress applied to the array waveguide or said array waveguide, and the first and second slab waveguides becomes zero, and the absolute figure of the stress is increased in line with an actual temperature shift from said reference temperature, and said stress applying means is provided in the optical waveguide circuit in an atmosphere of said reference temperature, wherein the center wavelengths of said respective light transmissions are made into almost said set wavelengths in a predetermined temperature range including at least said reference temperature.

20. A method for compensating a light transmission wavelength of an optical waveguide circuit as set forth in claim 16, wherein a stress applying means is provided, which applies a stress to an array waveguide or said array waveguide and the first and second slab waveguides in said set temperature so that the center wavelengths of said respective light transmissions become set wavelengths predetermined in a predetermined set temperature, and said stress applying means is provided in said optical waveguide circuit at an atmosphere temperature where the stress applied from said array waveguide or said array waveguide, and the first and second slab waveguides become zero, wherein the center wavelengths of said respective light transmissions are made into almost said set wavelengths in said set temperature.

21. A method for compensating a light transmission wavelength of an optical waveguide circuit, comprising the steps of:

connecting a first slab waveguide to the emitting side of one of more optical waveguides juxtaposed to each other, connecting an array waveguide consisting of a plurality of waveguides whose lengths are different from each other, which propagate lights led out from said first slab, to the emitting side of said first slab waveguide, connecting a second slab waveguide to the emitting side of said array waveguide, forming a waveguide construction consisting of a plurality of optical output waveguides juxtaposed to each other, on a substrate at the emitting side of said second slab waveguide, providing an optical dividing feature for dividing lights of a plurality of wavelengths from lights having a plurality of wavelengths different from each other, which are inputted from said optical input waveguides, and outputting the same from respective optical output waveguides, causing a light transmission feature of the respective lights outputted from the respective corresponding optical output waveguides to have the center wavelengths of light transmission different from each other in at least a predetermined wavelength area, and compensating a temperature dependency fluctuation of the center wavelengths of the light transmission;

wherein, when the center wavelengths of said light transmissions, respectively, shifts by an almost equal shift amount of wavelength from the respective predetermined wavelengths corresponding to the center wavelengths of the respective light transmissions, a shift of the center wavelengths of said respective light transmissions is reduced by providing a stress applying means which applies a stress in the direction of reducing said shift amount of wavelength to said array waveguide, and said array waveguide, and the first and second slab waveguides.

22. A method for compensating a light transmission wavelength of an optical waveguide circuit as set forth in any one of claims 16 through 21, wherein a warp applying means which applies a stress to an optical waveguide by warping said substrate is provided as a stress applying means.

23. A method for compensating a light transmission wavelength of an optical waveguide circuit as set forth in any one of claims 16 through 21, wherein a pressure applying means which applies pressure to a substrate surface in the vertical direction is provided as a stress applying means.

24. A method for compensating a light transmission wavelength of an optical waveguide circuit as set forth in any one of claims 16 through 21, wherein a horizontal direction stress applying means which applies a tensile force or a compression force to said substrate in the horizontal direction is provided as a stress applying means.

25. A method for compensating a light transmission wavelength of an optical waveguide circuit as set forth in claim 24, wherein a warp applying portion whose linear expansion coefficient is different from that of said substrate is provided with at least one of either the surface side of said optical waveguide or the rear side of the substrate to form a warp applying means.

26. A method for compensating a light transmission wavelength of an optical waveguide circuit as set forth in claim 25, wherein a resin layer or a filler-contained resin layer is formed with at least one of either the surface side of said optical waveguide or the rear side of the substrate as a warp applying portion.

27. A method for compensating a light transmission wavelength of an optical waveguide circuit as set forth in claim 22, wherein a plate-shaped member whose linear expansion coefficient is different from that of said substrate is adhered to or welded to at least one of either the surface side of the optical waveguide or the rear side of the substrate to form a warp applying means.

28. A method for compensating a light transmission wavelength of an optical waveguide circuit as set forth in claim 22, wherein a temperature dependent warp changing portion in which the warp amount is changed on the basis of a temperature is provided with at least one of either the surface side of the optical waveguide or the rear side of the substrate to form a warp applying means.

29. A method for compensating a light transmission wavelength of an optical wavelength of an optical waveguide circuit as set forth in claim 28, wherein a plurality of plates whose linear expansion coefficients are different from each other are bonded to form a temperature dependent warp changing portion.

30. A method for compensating a light transmission wavelength of an optical waveguide circuit as set forth in claim 28, wherein a temperature dependent warp changing portion is formed of a shape memory alloy plate.

* * * * *